US007885461B2

(12) United States Patent
Ishimoto et al.

(10) Patent No.: US 7,885,461 B2
(45) Date of Patent: Feb. 8, 2011

(54) SIGNAL PROCESSING APPARATUS AND METHOD, AND PROGRAM

(75) Inventors: Ko Ishimoto, Tokyo (JP); Koichiro Kakinuma, Tokyo (JP); Takehiro Nakatsue, Kanagawa (JP); Tatsuhiko Matsumoto, Tokyo (JP); Shuichi Haga, Kanagawa (JP); Hiroshi Takizuka, Tokyo (JP); Yoshiki Shirochi, Chiba (JP); Naoya Katoh, Chiba (JP); Hiroshi Yamashita, Kanagawa (JP); Koichi Oura, Tokyo (JP); Yoshihiro Kosugi, Tokyo (JP); Junichi Iwai, Kanagawa (JP); Kazuji Uemura, Tokyo (JP); Shigeo Kubota, Kanagawa (JP); Hideo Morita, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/586,667

(22) Filed: Sep. 25, 2009

(65) Prior Publication Data

US 2010/0046835 A1 Feb. 25, 2010

Related U.S. Application Data

(63) Continuation of application No. 10/572,604, filed as application No. PCT/JP2005/012827 on Jul. 12, 2005, now Pat. No. 7,616,812.

(30) Foreign Application Priority Data

Jul. 20, 2004 (JP) ............................ P2004-211419

(51) Int. Cl.
*G06K 9/00* (2006.01)
(52) U.S. Cl. ...................................... 382/167; 382/162

(58) Field of Classification Search ................. 382/162, 382/167; 348/674, 254; 386/37, 123; 324/318, 324/322; 360/53, 54; 347/14; 358/516, 358/527; 356/246, 427
See application file for complete search history.

(56) References Cited

U.S. PATENT DOCUMENTS 4,984,077 A * 1/1991 Uchida ....................... 348/458

(Continued)

FOREIGN PATENT DOCUMENTS

JP 62-200889 A 9/1987

(Continued)

OTHER PUBLICATIONS

Office Action from corresponding Singapore Application 200601454-2 citing Australian Search Report.

(Continued)

*Primary Examiner*—Anh Hong Do
(74) *Attorney, Agent, or Firm*—Lerner, David, Littenberg, Krumholz & Mentlik, LLP

(57) ABSTRACT

Signals are provided which allow colors in a wider color range than predetermined standards, which can be handled by apparatus according to such predetermined standards. A primary color converter converts first color signals having primary color points in a wider color range than the primary color points according to BT.709 into second color signals based on the primary colors according to BT.709. A photoelectric transducer converts the second color signals into third color signals according to photoelectric transducer characteristics defined in a numerical range wider than a range from 0 to 1.0 of color signals corresponding to a luminance signal and color difference signals according to BT.709. A color signal converter converts the third color signals into a luminance signal and color difference signals. A corrector incorporated in the color signal converter corrects the color difference signals into color difference signals.

5 Claims, 16 Drawing Sheets

U.S. PATENT DOCUMENTS

| | | |
|---|---|---|
| 5,583,397 A | 12/1996 | Ogawa |
| 5,982,432 A | 11/1999 | Uenoyama et al. |
| 6,335,983 B1 | 1/2002 | McCarthy et al. |
| 2001/0033286 A1 | 10/2001 | Stokes et al. |
| 2002/0122194 A1 | 9/2002 | Kuwata et al. |
| 2003/0052894 A1 | 3/2003 | Akiyama et al. |
| 2003/0052895 A1 | 3/2003 | Akiyama et al. |
| 2003/0123722 A1 | 7/2003 | Newman |
| 2010/0039526 A1* | 2/2010 | Ishimoto et al. .......... 348/222.1 |

FOREIGN PATENT DOCUMENTS

| | | |
|---|---|---|
| JP | 2002-314831 A | 10/2002 |
| JP | 2003-87587 A | 3/2003 |
| JP | 2003-92690 A | 3/2003 |

OTHER PUBLICATIONS

European Search Report, EP 05765717 dated Sep. 3, 2010.

IEC TC 100 VIA SC 29 Secretariat: "IEC CDV 61966-2-4 [SC 29 N 6741]" ITU Study Group 16 - Video Coding Experts Group-ISO/IEC MPEG & ITU-T VCEG(ISO/IEC JTC1/SC29/WG11 and ITU-T SG16 Q6), XX, XX, No. M12153, May 20, 2005, XP030040856.

SC29 (Uploaded by WG1 Convener) ED-Joint Photogenic Expert Group (JPEG): "IEC FDIS 61966-2-2: Multimedia systems and equipment—Colour measurement and management—Part 2-2: Colour management—Extended RGB colour space-scRGB [SC29N5040]" Joint Photographic Expert Group Conference, Crowborough : JPEG Forum Ltd, GB, Oct. 20, 2002, XP017205025.

* cited by examiner

|  | x | y |
|---|---|---|
| R (RED) | 0.64 | 0.33 |
| G (GREEN) | 0.30 | 0.60 |
| B (BLUE) | 0.15 | 0.06 |
| W (WHITE: D65) | 0.3127 | 0.3290 |

FIG. 5

| STANDARD | SIGNAL | SIGNAL DURATION |
|---|---|---|
| sRGB | R, G, B | digital count 0 – 255; SIGNAL LEVEL 0 – 1.0 |
| sYCC | Y | digital count 0 – 255; SIGNAL LEVEL 0 – 1.0 |
| | Cb, Cr | digital count 0 – 128 – 255; SIGNAL LEVEL -0.5 – 0 – 0.5 |
| (CONVENTIONAL SYSTEM) ITU-R BT. 601 ITU-R BT. 709 | R, G, B Y | digital count 1 16 – 235 254; SIGNAL LEVEL 0 – 1.0 |
| | Cb, Cr | digital count 1 16 – 128 – 240 254; SIGNAL LEVEL -0.5 – 0 – 0.5 |
| (PRESENT SYSTEM) | Y | digital count 1 16 – 235 254; SIGNAL LEVEL 0 – 1.0 |
| | Cb, Cr | digital count 1 16 – 128 – 240 254; SIGNAL LEVEL -0.57 -0.5 – 0 – 0.5 0.56 |

SIGNAL PROCESSING APPARATUS AND METHOD, AND PROGRAM

CROSS-REFERENCE TO RELATED APPLICATIONS

The present application is continuation of U.S. patent application Ser. No. 10/572,604, filed Nov. 20, 2006; now U.S. Pat. No. 7,616,812, which application is a national phase entry under 35U.S.C. 371 of International Application No. PCT/JP05/12827, filed Jul. 12, 2005 and published as WO 2006/009008 on Jan. 26, 2006; which international application claims priority from Japanese Patent Application No. P2004-211419, filed Jul. 20, 2004, all of which are incorporated herein by reference.

BACKGROUND OF THE INVENTION

The present invention relates to a signal processing apparatus, a signal processing method, and a program, and more particularly to a signal processing apparatus, a signal processing method, and a program for expressing colors in a color range wider than a conventional color range in the processing of an image signal.

In recent years, advances in the image processing technology have achieved higher image quality in video cameras for capturing and recording images and television receivers for displaying captured images, and have made it possible for present video cameras and television receivers to reproduce sharper images than conventional video cameras and television receivers.

FIG. 1 of the accompanying drawings shows an AV (Audio Visual) system including a video camera and a television receiver. In FIG. 1, a signal of an image captured by a video camera 1 is supplied through a recording medium 11 or a network 12 to a television receiver 2, which displays the image captured by the video camera 1.

Details of the video camera 1 and the television receiver 2 will be described below with reference to FIGS. 2 and 3 of the accompanying drawings.

FIG. 2 shows in block form details of the video camera 1 illustrated in FIG. 1. The video camera 1 performs its processing operation according to predetermined standards (e.g., ITU-R (International Telecommunication Union Radiocommunication sector) BT (Broadcasting service (Television)) .601 (hereinafter referred to as BT.601) or ITU-R BT.709 (hereinafter referred to as BT.709)). It is assumed here that the video camera 1 performs its processing operation according to BT.709.

In FIG. 2, the video camera 1 includes a operation unit 21, an image capturing unit 22, an A/D converter 23, a primary color converter 24, a color signal corrector 25, a photoelectric transducer 26, a color signal converter 27, an encoder 28, a controller 29, a recorder 30, and a communication unit 31.

The operation unit 21 is operated by the user when the user enters various commands into the video camera 1. The operation unit 21 supplies signals representing the execution of processing sequences that are indicated by the operation by the user of the operation unit 21, to blocks that perform the respective processing sequences. For example, the operation unit 21 supplies the image capturing unit 22 with a signal representing the capturing of an image, and also supplies the controller 29 with a signal representing a destination of a signal (hereinafter referred to as an image signal) indicative of an image captured by the image capturing unit 22.

The image capturing unit 22 starts or stops an image capturing process according to an instruction from the operation unit 21. The image capturing unit 22 supplies an image signal indicative of an image captured by the image capturing unit 22 to the A/D (Analog/Digital) converter 23. The image capturing unit 22 includes a CMOS (Complementary Metal Oxide Semiconductor) imager, a CCD (Charge Coupled Device), or the like, and outputs color signals R, G, B (Red, Green, Blue) as an image signal.

The A/D converter 23 converts analog color signals supplied from the image capturing unit 22 into digital color signals, and supplies the digital color signals to the primary color converter 24. The color signals R, G, B that are supplied from the A/D converter 23 to the primary color converter 24 are referred to as color signals $R_{org}$, $G_{org}$, $B_{org}$.

The primary color converter 24 converts the color signals $R_{org}$, $G_{org}$, $B_{org}$ supplied from the A/D converter 23 into color signals $R_{709}$, $G_{709}$, $B_{709}$ based on primary colors under BT.709, and supplies the color signals $R_{709}$, $G_{709}$, $B_{709}$ to the color signal corrector 25. Specifically, the primary color converter 24 converts the color signals $R_{org}$, $G_{org}$, $B_{org}$ supplied from the A/D converter 23 into color signals $R_{709}$, $G_{709}$, $B_{709}$ based on primary colors under BT.709 according to the following equation (1):

$$\begin{pmatrix} R_{709} \\ G_{709} \\ B_{709} \end{pmatrix} = \begin{pmatrix} 1.5968 & -0.6351 & 0.0383 \\ -0.1464 & 1.2259 & -0.0795 \\ -0.0141 & -0.1086 & 1.1227 \end{pmatrix} \begin{pmatrix} R_{org} \\ G_{org} \\ B_{org} \end{pmatrix} \quad (1)$$

The matrixes of the equation (1) differ depending on the primary color points of the image capturing unit 22.

The color signal corrector 25 corrects the color signals $R_{709}$, $G_{709}$, $B_{709}$ supplied from the primary color converter 24 into color signals $R_{709}$, $G_{709}$, $B_{709}$ in a numerical range from 0 to 1.0 defined according to BT.709. Specifically, the color signal corrector 25 corrects color signals $R_{709}$, $G_{709}$, $B_{709}$ which are smaller than 0 into 0, i.e., clips color signals $R_{709}$, $G_{709}$, $B_{709}$, and corrects color signals $R_{709}$, $G_{709}$, $B_{709}$ which are greater than 1.0 into 1.0, and supplies the corrected color signals $R_{709}$, $G_{709}$, $B_{709}$ to the photoelectric transducer 26. It is assumed that the numerical values 0, 1.0 of the numerical range from 0 to 1.0 are minimum and maximum values, respectively, of the color signals $R_{709}$, $G_{709}$, $B_{709}$ according to BT.709.

The photoelectric transducer 26 converts the color signals $R_{709}$, $G_{709}$, $B_{709}$ supplied from the color signal corrector 25 into color signals $R'_{709}$, $G'_{709}$, $B'_{709}$ that are corrected with the γ of a display mechanism of B.709 (the nonlinearity of light emission luminance with respect to the image signal) according to photoelectric transducer characteristics according to BT.709, and supplies the converted color signals $R'_{709}$, $G'_{709}$, $B'_{709}$ to the color signal converter 27.

Specifically, the photoelectric transducer 26 converts the color signals $R_{709}$, $G_{709}$, $B_{709}$ into color signals $R'_{709}$, $G'_{709}$, $B'_{709}$ according to the following equation (2) and supplies the converted color signals $R'_{709}$, $G'_{709}$, $B'_{709}$ to the color signal converter 27:

$R'_{709} = 1.099 \times (R_{709})^{0.45} - 0.099 \quad 0.018 \leq R_{709} \leq 1.0$ $R'_{709} = 4.5 \times R_{709} \quad 0 \leq R_{709} < 0.018 \quad (2)$ The photoelectric transducer characteristics between the color signal $R_{709}$ and the color signal $R'_{709}$ are defined in the range from the minimum value to the maximum value of the color signal $R_{709}$ according to BT.709, i.e., in the range from 0 to 1.0. The photoelectric transducer characteristics between the color signal $G_{709}$ and the color signal $G'_{709}$ and the photoelectric transducer characteristics between the color signal $B_{709}$ and the color signal $B'_{709}$ are also similarly defined.

The color signal converter 27 converts the color signals $R'_{709}$, $G'_{709}$, $B'_{709}$ supplied from the photoelectric transducer 26 into a luminance signal $Y'_{709}$ and color difference signals $Cb'_{709}$, $Cr'_{709}$ under BT.709 according to the equation (3) shown below, and supplies the luminance signal $Y'_{709}$ and the color difference signals $Cb'_{709}$, $Cr'_{709}$, each expressed in 8 bits, to the encoder 28.

$$\begin{pmatrix} Y'_{709} \\ Cb'_{709} \\ Cr'_{709} \end{pmatrix} = \begin{pmatrix} 0.2126 & 0.7152 & 0.0722 \\ -0.1146 & -0.3854 & 0.5000 \\ 0.5000 & -0.4542 & -0.0458 \end{pmatrix} \begin{pmatrix} R'_{709} \\ G'_{709} \\ B'_{709} \end{pmatrix} \quad (3)$$

The matrixes of the equation (3) are matrixes prescribed for 1125/60/2:1 Signal Format under BT.709.

According to BT.709, the luminance signal $Y'_{709}$ generated by the color signal converter 27 according to the equation (3) is of value in a numerical range from 0 to 1.0. Each of the color difference signals $Cb'_{709}$, $Cr'_{709}$ generated by the color signal converter 27 according to the equation (3) is of value in a numerical range from −0.5 to 0.5.

Furthermore, the color signal converter 27 assigns the luminance signal $Y'_{709}$ in the numerical range from 0 to 1.0, which is generated by the color signal converter 27 according to the equation (3), to an integral value in an integral range from 16 to 235 which is smaller than an integral range from 0 to 255 that can be expressed in 8 bits, and supplies the luminance signal $Y'_{709}$ that is assigned to the integral value as a luminance signal according to BT.709 to the encoder 28. The color signal converter 27 assigns each of the color difference signals $Cb'_{709}$, $Cr'_{709}$ in the numerical range from −0.5 to 0.5, which is generated by the color signal converter 27 according to the equation (3), to an integral value in an integral range from 16 to 240 which is smaller than the integral range from 0 to 255 that can be expressed in 8 bits, and supplies the color difference signals $Cb'_{709}$, $Cr'_{709}$ that are assigned to the integral value as color difference signals according to BT.709 to the encoder 28.

The encoder 28 encodes the luminance signal $Y'_{709}$ and the color difference signals $Cb'_{709}$, $Cr'_{709}$, each in 8 bits, supplied from the color signal converter 27 according to a predetermined format, for example, such as MPEG (Moving Picture Experts Group) and supplies the resultant encoded data to the controller 29.

The controller 29 supplies the encoded data supplied from the encoder 28 to the recorder 30 or the communication unit 31 according to an instruction from the operation unit 21.

The recorder 30 records the encoded data supplied from the controller 29 in the recording medium 11 shown in FIG. 1. The communication unit 31 transmits the encoded data supplied from the controller 29 through the network 12 shown in FIG. 1.

FIG. 3 shows in block form the television receiver 2 shown in FIG. 1. The television receiver 2 performs its processing operation according to predetermined standards (e.g., BT.601 or BT.709). It is assumed here that the television receiver 2 performs its processing operation according to BT.709.

As shown in FIG. 3, the television receiver 2 includes an image signal input unit 41, a luminance and color difference signal converter 42, an inherent γ characteristics corrector 43, a D/A converter 44, and a display mechanism 45.

The image signal input unit 41 receives encoded data reproduced from the recording medium 11 or transmitted from the network 12. The image signal input unit 41 also decodes the encoded data according to a predetermined format such as MPEG, for example, and supplies a luminance signal $Y'_{709}$ and color difference signals $Cb'_{709}$, $Cr'_{709}$, each expressed in 8 bits, according to BT.709, which are produced from the decoded data, to the luminance and color difference signal converter 42.

The luminance and color difference signal converter 42 converts the luminance signal Y'709 and the color difference signals $Cb'_{709}$, $Cr'_{709}$ supplied from the image signal input unit 41 into color signals $R'_{709}$, $G'_{709}$, $B'_{709}$ under BT.709 according to the equation (4) shown below, and supplies the color signals $R'_{709}$, $G'_{709}$, $B'_{709}$ to the inherent γ characteristics corrector 43.

$$\begin{pmatrix} R'_{709} \\ G'_{709} \\ B'_{709} \end{pmatrix} = \begin{pmatrix} 1.0000 & 0.0000 & 1.5747 \\ 1.0000 & -0.1873 & -0.4682 \\ 1.0000 & 1.8556 & 0.0000 \end{pmatrix} \begin{pmatrix} Y'_{709} \\ Cb'_{709} \\ Cr'_{709} \end{pmatrix} \quad (4)$$

The luminance signal $Y'_{709}$ according to BT.709 which is supplied from the image signal input unit 41 to the luminance and color difference signal converter 42 is of an integral value in an integral range from 16 to 235 which can be expressed in 8 bits, as described above. Each of the color difference signals $Cb'_{709}$, $Cr'_{709}$ according to BT.709 which are supplied from the image signal input unit 41 to the luminance and color difference signal converter 42 is of an integral value in an integral range from 16 to 240 which can be expressed in 8 bits, as described above.

The luminance and color difference signal converter 42 sets the luminance signal $Y'_{709}$ of the integral value in the integral range from 16 to 235, which is supplied to the luminance and color difference signal converter 42, to a value in a numerical range from 0 to 1.0, and also sets each of the color difference signals $Cb'_{709}$, $Cr'_{709}$ of the integral value in the integral range from 16 to 240 to a value in a numerical range from −0.5 to 0.5. The luminance and color difference signal converter 42 also converts the luminance signal $Y'_{709}$ expressed in the numerical range from 0 to 1.0 and the color difference signals $Cb'_{709}$, $Cr'_{709}$ expressed in the numerical range from −0.5 to 0.5 into color signals $R'_{709}$, $G'_{709}$, $B'_{709}$ according to the equation (4).

If the γ characteristics of the display mechanism 45 of the television receiver 2 are different from the photoelectric transducer characteristics (γ characteristics) represented by the equation (2) of BT.709, then the inherent γ characteristics corrector 43 converts the color signals $R'_{709}$, $G'_{709}$, $B'_{709}$ supplied from the luminance and color difference signal converter 42 into color signals $R'_{709}$, $G'_{709}$, $B'_{709}$ according to the inherent γ characteristics of the display mechanism 45 (CRT (Cathode Ray Tube) or the like) of the television receiver 2, and supplies the color signals $R'_{709}$, $G'_{709}$, $B'_{709}$ to the D/A converter 44.

If the γ characteristics of the display mechanism 45 of the television receiver 2 are identical to the photoelectric transducer characteristics of BT.709, then the inherent γ characteristics corrector 43 is not required.

The D/A converter 44 converts the digital color signals $R'_{709}$, $G'_{709}$, $B'_{709}$ supplied from the inherent γ characteristics corrector 43 into analog color signals $R'_{709}$, $G'_{709}$, $B'_{709}$, and supplies the analog color signals $R'_{709}$, $G'_{709}$, $B'_{709}$ to the display mechanism 45.

The display mechanism 45 includes a CRT or the like, and displays an image based on the color signals R'$_{709}$, G'$_{709}$, B'$_{709}$ supplied from the D/A converter 44.

The color signals, the luminance signals, and the color difference signals according to BT.709 which are processed in the video camera 1 and the television receiver 2 are prescribed in RECOMMENDATION ITU-R BT.709-4.

FIG. 4 of the accompanying drawings shows the chromaticity coordinate positions of primary colors and reference white in the CIE (Commission Internationale de I'Eclariage) calorimetric system.

SUMMARY OF THE INVENTION

Since the color signals are processed according to the standards of BT.709 in the video camera 1 and the television receiver 2 as described above, the video camera 1 and the television receiver 2 are incapable of expressing colors not under the standards of BT.709.

If color signals, luminance signals, and color difference signals are uniquely defined regardless of BT.709, then colors in a wide color range can be expressed. However, it is difficult to process the color signals, the luminance signals, and the color difference signals that are thus uniquely defined in television receivers according to BT.709.

It is therefore an object of the present invention to provide signals which allow colors in a wider color range than predetermined standards such as BT.709, for example, and which can be handled by apparatus according to such predetermined standards.

According to the present invention, there is provided a first signal processing which includes a primary color converting unit for converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to the predetermined standard, a characteristics converting unit for converting the second color signals into third color signals according to photoelectric transducer characteristics defined in a numerical range which is greater than a numerical range of color signals corresponding to a luminance signal and color difference signals according to the predetermined standard, a color signal converting unit for converting the third color signals into a luminance signal and color difference signals, and a correcting unit for correcting the luminance signal generated by the color signal converting unit into a luminance signal according to the predetermined standard, and correcting the color difference signals generated by the color signal converting unit into color difference signals in a second numerical range containing the first numerical range, the color difference signals being assigned to an integral value in the second numerical range which can be expressed by the plurality of bits.

In the first signal processing apparatus, the photoelectric transducer characteristics are in point symmetry with respect to an origin.

In the first signal processing apparatus, all of the primary color converting unit, the characteristics converting unit, and the color signal converting unit include a single look up table.

According to the present invention, there is provided a first signal processing method which includes the steps of converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to the predetermined standard, converting the second color signals into third color signals according to photoelectric transducer characteristics defined in a numerical range which is greater than a numerical range of color signals corresponding to a luminance signal and color difference signals according to the predetermined standard, converting the third color signals into a luminance signal and color difference signals, and correcting the luminance signal generated by the step of converting the third color signals, into a luminance signal according to the predetermined standard, and correcting the color difference signals generated by the step of converting the third color signals, into color difference signals in a second numerical range containing the first numerical range, the color difference signals being assigned to an integral value in the second numerical range which can be expressed by the plurality of bits.

According to the present invention, there is provided a first program which enables a computer to perform a signal processing process including the steps of converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to the predetermined standard, converting the second color signals into third color signals according to photoelectric transducer characteristics defined in a numerical range which is greater than a numerical range of color signals corresponding to a luminance signal and color difference signals according to the predetermined standard, converting the third color signals into a luminance signal and color difference signals, and correcting the luminance signal generated by the step of converting the third color signals, into a luminance signal according to the predetermined standard, and correcting the color difference signals generated by the step of converting the third color signals, into color difference signals in a second numerical range containing the first numerical range, the color difference signals being assigned to an integral value in the second numerical range which can be expressed by the plurality of bits.

According to the present invention, there is provided a second signal processing apparatus wherein a luminance signal and color difference signals include a luminance signal and color difference signals obtained by converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to the predetermined standard, converting the second color signals into third color signals according to photoelectric transducer characteristics defined in a numerical range which is greater than a numerical range of color signals corresponding to a luminance signal and color difference signals according to the predetermined standard, and converting the third color signals into a luminance signal and color difference signals, wherein the luminance signal includes a luminance signal according to the predetermined standard and the color difference signals include color difference signals in a second numerical range containing the first numerical range, the color difference signals being assigned to an integral value in the second numerical range which can be expressed by the plurality of bits, wherein the signal processing apparatus includes a luminance and color difference signal converting unit for converting the luminance signal according to the predetermined standard and the color difference signals in the second numerical range into the third color signals, a characteristic converting unit for converting the third color signals into the second color signals according to the photoelectric transducer characteristics, a primary color converting unit for converting the second color signals into the first color signals, and a correcting unit for correcting the first color signals into signals in a numerical range which can be displayed by a display mechanism for displaying an image.

In the second signal processing apparatus, the photoelectric transducer characteristics are in point symmetry with respect to an origin.

In the second signal processing apparatus, all of the luminance and color difference signal converting unit, the characteristics converting unit, and the primary color converting unit include a single look up table.

According to the present invention, there is provided a second signal processing method wherein the luminance signal and the color difference signals include a luminance signal and color difference signals obtained by converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to the predetermined standard, converting the second color signals into third color signals according to photoelectric transducer characteristics defined in a numerical range which is greater than a numerical range of color signals corresponding to a luminance signal and color difference signals according to the predetermined standard, and converting the third color signals into a luminance signal and color difference signals, wherein the luminance signal includes a luminance signal according to the predetermined standard and the color difference signals include color difference signals in a second numerical range containing the first numerical range, the color difference signals being assigned to an integral value in the second numerical range which can be expressed by the plurality of bits, wherein the signal processing method includes the steps of converting the luminance signal according to the predetermined standard and the color difference signals in the second numerical range into the third color signals, converting the third color signals into the second color signals according to the photoelectric transducer characteristics, converting the second color signals into the first color signals, and correcting the first color signals into signals in a numerical range which can be displayed by a display mechanism for displaying an image.

According to the present invention, there is provided a second program for enabling a computer to perform a signal processing process wherein the luminance signal and the color difference signals include a luminance signal and color difference signals obtained by converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to the predetermined standard, converting the second color signals into third color signals according to photoelectric transducer characteristics defined in a numerical range which is greater than a numerical range of color signals corresponding to a luminance signal and color difference signals according to the predetermined standard, converting the third color signals into a luminance signal and color difference signals, wherein the luminance signal includes a luminance signal according to the predetermined standard and the color difference signals include color difference signals in a second numerical range containing the first numerical range, the color difference signals being assigned to an integral value in the second numerical range which can be expressed by the plurality of bits, wherein the signal processing process includes the steps of converting the luminance signal according to the predetermined standard and the color difference signals in the second numerical range into the third color signals, converting the third color signals into the second color signals according to the photoelectric transducer characteristics, converting the second color signals into the first color signals, correcting the first color signals into signals in a numerical range which can be displayed by a display mechanism for displaying an image.

With the first signal processing apparatus, the first signal processing method, and the first program according to the present invention, first color signals having primary color points in a wider color range than primary color points according to a predetermined standard by which color difference signals having a first numerical range are assigned to an integral value in a first integral range which is smaller than an integral range which can be expressed by a plurality of bits, are converted into second color signals based on primary colors according to the predetermined standard, the second color signals are converted into third color signals according to photoelectric transducer characteristics defined in a numerical range which is greater than a numerical range of color signals corresponding to a luminance signal and color difference signals according to the predetermined standard. The third color signals are converted into a luminance signal and color difference signals, and the luminance signal is corrected into a luminance signal according to the predetermined standard, and the color difference signals are corrected into color difference signals in a second numerical range containing the first numerical range, the color difference signals being assigned to an integral value in the second numerical range which can be expressed by the plurality of bits.

With the second signal processing apparatus, the second signal processing method, and the second program according to the present invention, a luminance signal and color difference signals include a luminance signal and color difference signals obtained by converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to the predetermined standard, converting the second color signals into third color signals according to photoelectric transducer characteristics defined in a numerical range which is greater than a numerical range of color signals corresponding to a luminance signal and color difference signals according to the predetermined standard, and converting the third color signals into a luminance signal and color difference signals, wherein the luminance signal includes a luminance signal according to the predetermined standard and the color difference signals include color difference signals in a second numerical range containing the first numerical range, the color difference signals being assigned to an integral value in the second numerical range which can be expressed by the plurality of bits. The luminance signal according to the predetermined standard and the color difference signals in the second numerical range are converted into the third color signals, and the third color signals are converted into the second color signals according to the photoelectric transducer characteristics. The second color signals are converted into the first color signals, and the first color signals are corrected into signals in a numerical range which can be displayed by a display mechanism for displaying an image.

According to the present invention, colors in a wide color range can be expressed by signals that can be handled by predetermined standards such as BT.709, for example.

BRIEF DESCRIPTION OF THE DRAWINGS

FIG. 5 is a diagram showing the relationship between signal levels of signals according to various standards and integral values representing the signals levels.

DETAILED DESCRIPTION

Figure 1:
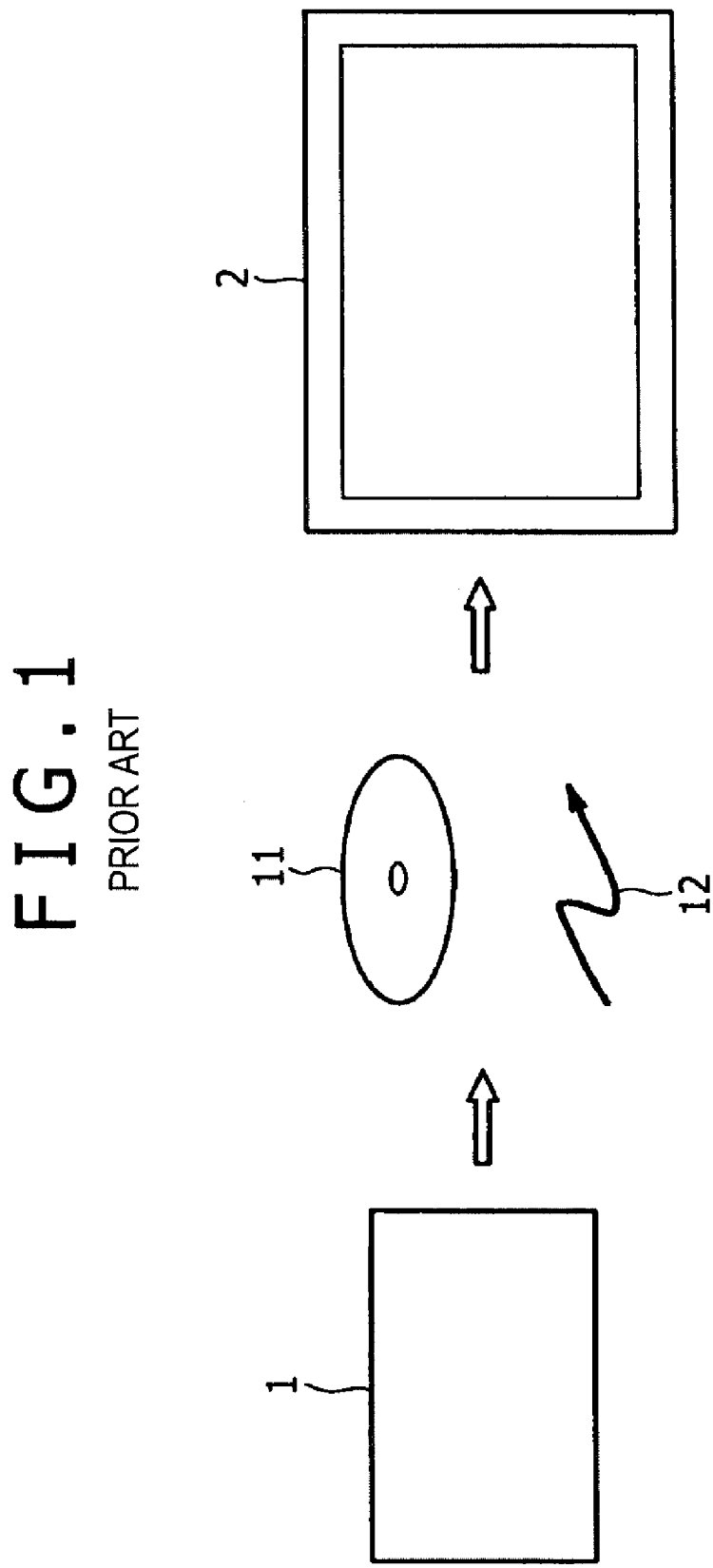
FIG. 1 is a block diagram of a conventional AV system.
Figure 2:
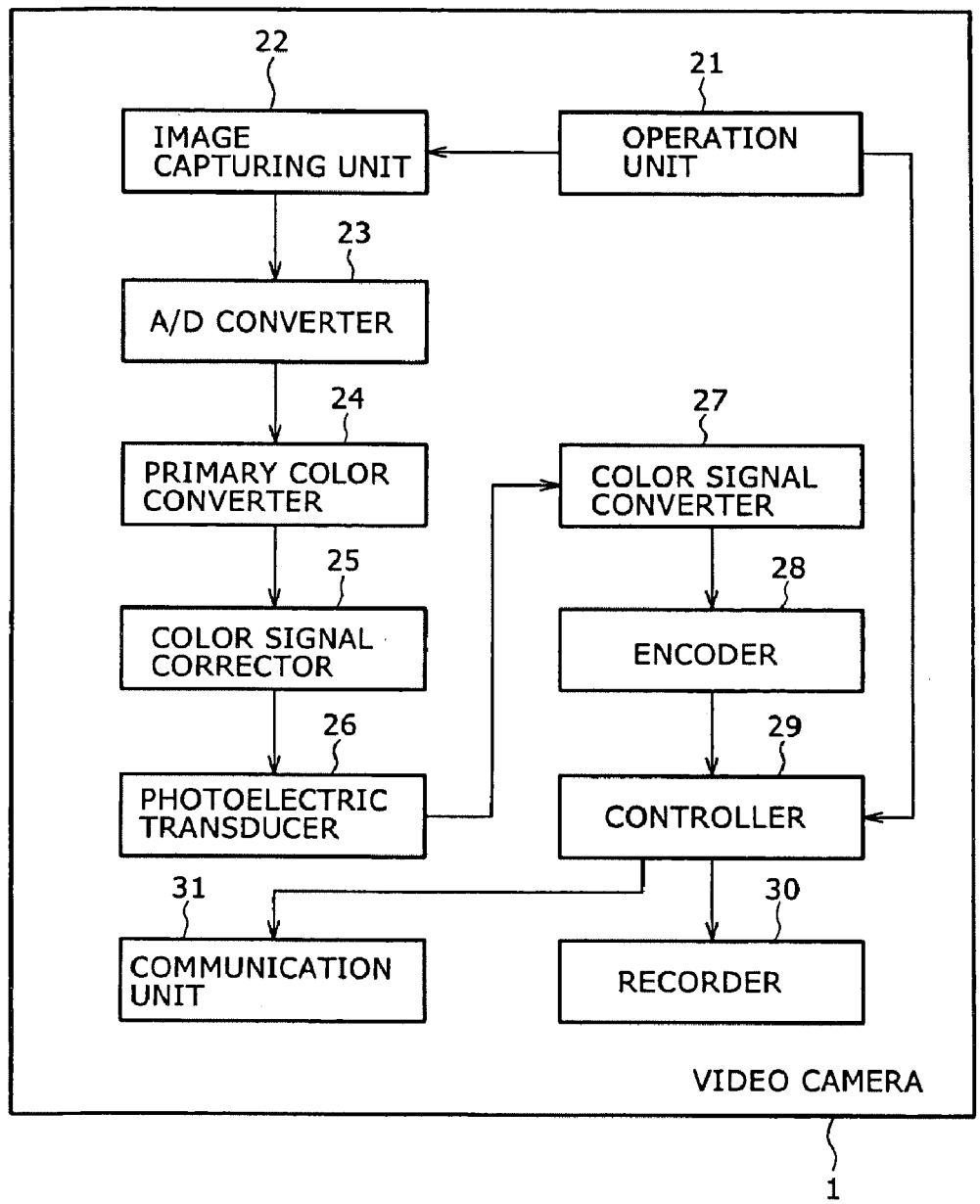
FIG. 2 is a block diagram of a video camera of the conventional AV system shown in FIG. 1.

Prior to the description of an embodiment of the present invention, a color space employed by the embodiment of the present invention will be described below in comparison with existing color spaces according to international standards.

FIG. 5 shows the relationship between signal levels of signals according to international standards and integral values representing those signals levels.

According to sRGB standards for a color space prescribed by IEC (International Electrotechnical Commission), 8 bits are used to express color signals R, G, B, and the signal levels of the color signals R, G, B ranging from 0 to 1.0 are assigned to values ranging from 0 to 255 which can be expressed by 8 bits. Each of the color signals R, G, B is represented by 256 (=255−0+1) gradations.

According to sYCC standards for a luminance signal and color difference signals for still images, the luminance signal Y is expressed using 8 bits as with the sRGB standards, and the signal level of the luminance signal Y ranging from 0 to 1.0 is assigned to values ranging from 0 to 255 which can be expressed by 8 bits. The luminance signal Y is represented by 256 (=255−0+1) gradations.

The color difference signals Cb, Cr are expressed using 8 bits, and the signal levels of the color difference signals Cb, Cr ranging from −0.5 to 0.5 are assigned to values ranging from 0 to 255 which can be expressed by 8 bits. The color difference signals Cb, Cr are represented by 256 (=255−0+1) gradations.

Color signals, luminance signals, and color difference signals according to BT.601 standards for SDTV (Standard Definition Television) and BT.709 standards for HDTV (High Definition Television) will be described below.

According to BT.709, 8 bits are used to express color signals R, G, B, and the signal levels of the color signals R, G, B ranging from 0 to 1.0 are assigned to integral values in an integral range from 16 to 235 which is smaller than the range from 0 to 255 that can be expressed by 8 bits. Each of the color signals R, G, B is represented by 220 (=235−16+1) gradations.

According to BT.709, 8 bits are used to express a luminance signal Y, and the signal level of the luminance signal Y ranging from 0 to 1.0 is assigned to integral values in an integral range from 16 to 235 which is smaller than the range from 0 to 255 that can be expressed by 8 bits. The luminance signal Y is represented by 220 (=235−16+1) gradations.

According to BT.709, 8 bits are used to express color difference signals Cb, Cr, and the signal levels of the color difference signals Cb, Cr ranging from −0.5 to 0.5 are assigned to integral values in an integral range from 16 to 240 which is smaller than the range from 0 to 255 that can be expressed by 8 bits. Each of the color difference signals Cb, Cr is represented by 225 (=240−16+1) gradations.

The color signals, the luminance signal, and the color difference signals according to BT.601 are prescribed as with BT.709. According to BT.709 and BT.601, 0 and 255 of the values ranging from 0 to 255 that are expressed by 8 bits representing signals are not used.

The color space according to the present invention will be described below.

According to the present invention, the color space is based on an expanded version of given standards wherein signals having respective signal levels are assigned to integral values in an integral range which is smaller than an integral range that can be expressed by a plurality of bits, e.g., BT.709 wherein color difference signals Cb, Cr ranging from −0.5 to 0.5 are assigned to integral values in an integral range from 16 to 240 which is smaller than the range from 0 to 255 that can be expressed by 8 bits.

Specifically, according to the present invention, a luminance signal Y is defined as with BT.709. That is, 8 bits are used to express the luminance signal Y, and the signal level of the luminance signal Y ranging from 0 to 1.0 is assigned to integral values in an integral range from 16 to 235 which is smaller than the range from 0 to 255 that can be expressed by 8 bits. Therefore, the luminance signal Y having the signal level ranging from 0 to 1.0 is represented by 220 (=235−16+1) gradations as with BT.709.

According to the present invention, 8 bits are used to express color difference signals Cb, Cr, and the signal levels of the color difference signals Cb, Cr ranging from −0.5 to 0.5 are assigned to integral values in an integral range from 16 to 240 which is smaller than the range from 0 to 255 that can be expressed by 8 bits, as with BT.709.

However, an integral range to which the signal levels of the color difference signals Cb, Cr are assigned is expanded to an integral range from 1 to 254 which contains the integral range from 16 to 240 to which signal levels are assigned according to BT.709. Specifically, according to the present invention, as with BT.709, each of the color difference signals Cb, Cr ranging from −0.5 to 0.5 is assigned to an integral range of 225 (=240−16+1) gradations from 16 to 240, and the signal levels for the integral range from 16 to 240 are also assigned to an integral range from 1 to 15 and an integral range from 241 to 254.

As a result, signal levels ranging from −0.57 to 0.56 are assigned to an integral range from 1 to 254. Consequently, according to the present invention, the color difference signals Cb, Cr whose signal levels are in the range from −0.57 to 0.56 are represented by 254 (=254−1+1) gradations.

As described above, according to the present invention, color difference signals Cb, Cr whose signal levels are in the range from −0.57 to 0.56, which includes color difference signals Cb, Cr of BT.709 ranging from −0.5 to 0.5 can be realized.

According to the present invention, therefore, it is possible to express colors in a wider color range than the colors that can be expressed according to BT.709.

The luminance signal Y according to the present invention is identical to the luminance signal Y according to BT.709, and the color difference signals Cb, Cr according to the present invention are identical to the color difference signals Cb, Cr according to BT.709 with respect to the signal levels ranging from −0.5 to 0.5 that are assigned to the integral range from 16 to 240. Therefore, the luminance signal Y and the color difference signals Cb, Cr according to the present invention can be handled by apparatus according to BT.709, and can be used to display images in a range of colors that can be expressed by BT.709, for example.

According to the present invention, since the color difference signals Cb, Cr can have signal levels in the range from −0.57 to 0.56 which is wider than the range from −0.5 to 0.5, when the luminance signal Y and the color difference signals Cb, Cr according to the present invention are converted into color signals R, G, B, the signal levels of the color signals R, G, B can be of values out of the range from 0 to 1.0, i.e., can be of values less than 0 (negative values) or values greater than 1. The value 0 represents the minimum value of the color signals R, G, B according to BT.709, and the value 1 represents the maximum value of the color signals R, G, B according to BT.709.

As described above, according to the present invention, color signals R, G, B having negative values or values in excess of 1 can be handled, and mutual conversion is performed between such color signals R, G, B and the luminance signal Y ranging form 0 to 1.0 and the color difference signals Cb, Cr ranging from −0.57 to 0.56.

When an image is captured and color signals R, G, B of the image are to be converted into the luminance signal Y and the color difference signals Cb, Cr according to the present invention, if the luminance signal Y and the color difference signals Cb, Cr according to the present invention are to be handled by apparatus according to BT.709, it is necessary to convert the color signals R, G, B, which are to be converted into the luminance signal Y and the color difference signals Cb, Cr according to the present invention, into color signals R, G, B according to the photoelectric transducer characteristics of the display mechanism of BT.709 (γ correction).

According to BT.709, photoelectric transducer characteristics are defined with respect to the range from 0 to 1.0 that the color signals R, G, B can have, but no photoelectric transducer characteristics are defined with respect to negative values and values in excess of 1.0.

Since the color signals R, G, B to be converted into the luminance signal Y and the color difference signals Cb, Cr according to the present invention can have negative values and values in excess of 1.0, it is necessary to determine photoelectric transducer characteristics according to which the color signals R, G, B that can have negative values and values in excess of 1.0 are to be converted.

According to the present invention, the photoelectric transducer characteristics prescribed under BT.709 are applied to input values in the range in excess of 1.0. For input values in the range of negative values, the photoelectric transducer characteristics prescribed under BT.709 are expanded in point symmetry with respect to the origin, and the expanded photoelectric transducer characteristics are applied to those negative input values.

Figure 6:
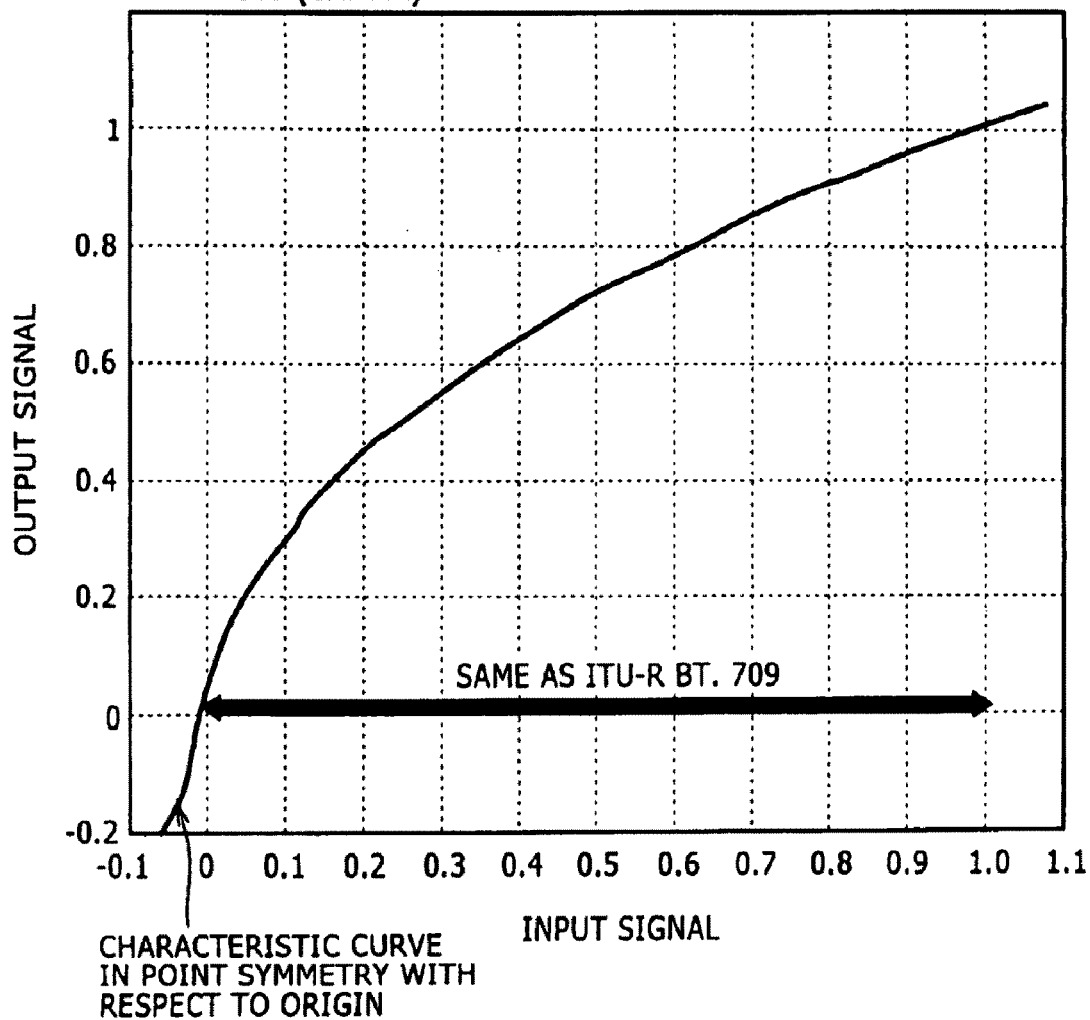
FIG. 6 is a diagram showing photoelectric transducer characteristics employed by the present invention.

FIG. 6 shows photoelectric transducer characteristics that are employed according to the present invention.

The photoelectric transducer characteristics according to the present invention as shown in FIG. 6 are identical to the photoelectric transducer characteristics according to BT.709 insofar as the input signals (color signals R, G, B) are in the range from 0 to 1.0.

Specifically, the portion of the photoelectric transducer characteristics shown in FIG. 6 wherein the input signals are in the range from 0 to 1.0 is expressed according to the equation (2) as defined under BT.709.

The portion of the photoelectric transducer characteristics shown in FIG. 6 wherein the input signals are in the range exceeding 1.0 is an expansion of the range from 0.018 to 1.0 according to the equation (2). The portion of the photoelectric transducer characteristics shown in FIG. 6 wherein the input signals are in the range of negative values is an expansion of the photoelectric transducer characteristics according to BT.709 in point symmetry with respect to the origin.

Therefore, the photoelectric transducer characteristics according to the present invention are expressed by the following equation (5):

$$R'_{ex709} = 1099 \times (R_{ex709})^{0.45} - 0.099 \quad 0.018 \leq R_{ex709}$$

$$R'_{ex709} = 4.5 \times R_{ex709} \quad -0.018 \leq R_{ex709} < 0.018$$

$$R'_{ex709} = -(1.099 \times (-R_{ex709})^{0.45} - 0.099) \quad R_{ex709} < -0.018 \quad (5)$$

In the equation (5), R represents a color signal R before it is converted according to the photoelectric transducer characteristics, and R' represents a color signal R after it is converted according to the photoelectric transducer characteristics. According to the present invention, color signals G, B are also converted according to the equation (5).

Colors that can be expressed according to the present invention will be described below.

Figure 7:
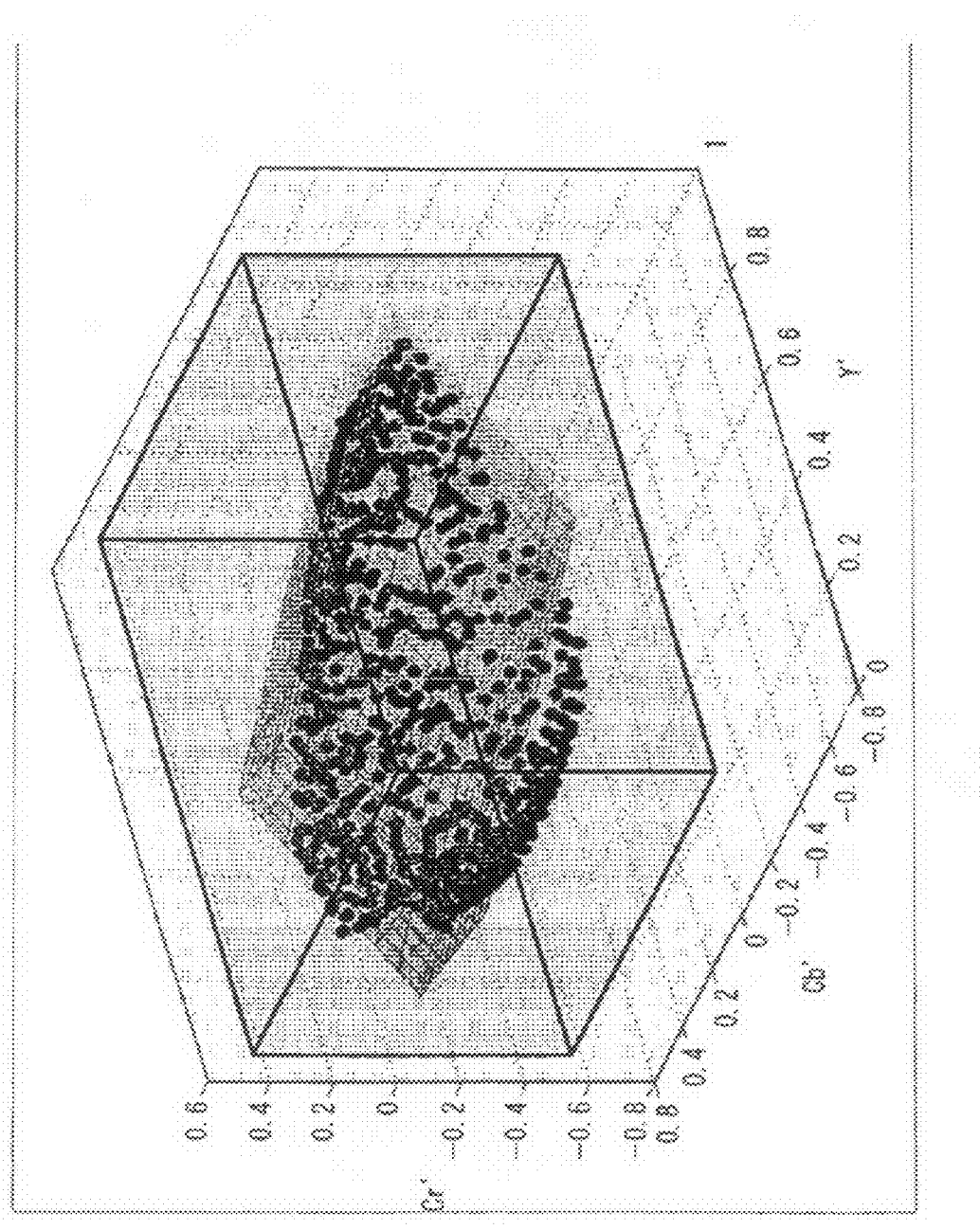
FIG. 7 is a diagram showing the relationship between a color space covered by ITU-R B.709 and a color space based on to 768 colors of the Munsell color cascade and sRGB standards.

FIG. 7 shows the relationship between a color space covered by BT.709 and a color space based on to 768 colors of high-color-saturation chroma called the Munsell color cascade and sRGB standards.

Color signals R, G, B are converted according to the photoelectric transducer characteristics, and the converted color signals R, G, B converted into a luminance signal Y and color difference signals Cb, Cr. In FIG. 7 (and also in FIGS. 8 and 9), a color space is expressed by three axes which represent the luminance signal Y and the color difference signals Cb, Cr thus generated. In FIG. 7, the luminance signal Y and the color difference signals Cb, Cr are indicated respectively as a luminance signal Y' and color difference signals Cb', Cr' in order to show that the luminance signal Y and the color difference signals Cb, Cr correspond to the color signals R, G, B converted according to the photoelectric transducer characteristics.

In FIG. 7, the marks • represent the 768 colors of the Munsell color cascade, and the range of a parallelepiped in a grid pattern represents colors expressed by color signals according to BT.709. The range of a rectangular parallelepiped in FIG. 7 represents a range covered by luminance and color difference signals according to BT.709.

The luminance and color difference signals according to BT.709 cover the color space according to the sRGB standards, but cannot fully cover the 768 colors of the Munsell color cascade.

Figure 8:
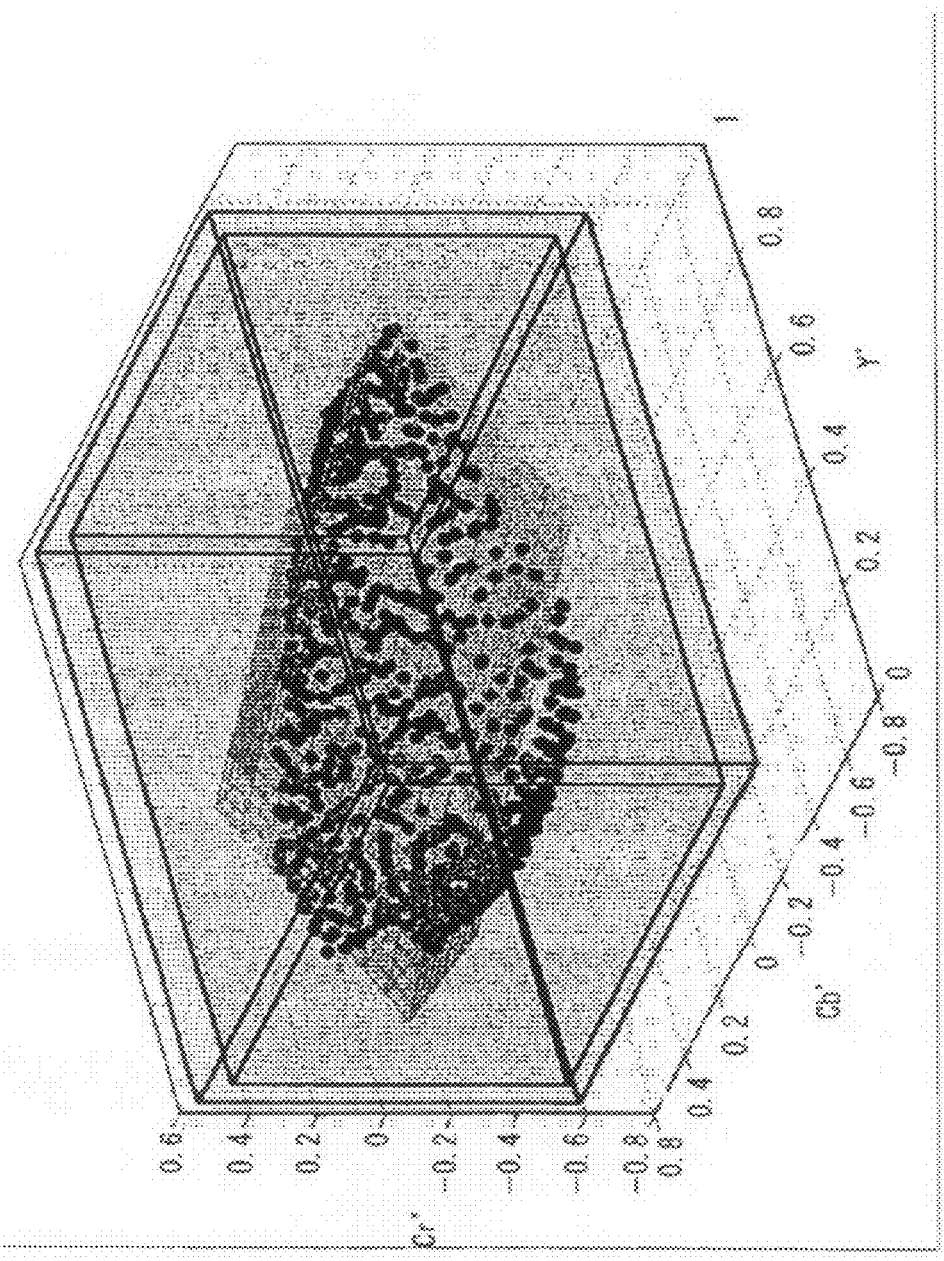
FIG. 8 is a diagram showing the relationship between a color space based on a luminance signal and color difference signals according to the present invention, a color signal based on 768 colors of the Munsell color cascade and color signals under BT.709, and a color space based on a luminance signal and color difference signals according to BT.709.

FIG. 8 shows the relationship between a color space based on a luminance signal and color difference signals according to the present invention, a color signal based on 768 colors of the Munsell color cascade and color signals under BT.709, and a color space based on a luminance signal and color difference signals according to BT.709.

In FIG. 8, the marks • represent the 768 colors of the Munsell color cascade, and the range of a parallelepiped in a grid pattern represents colors expressed by color signals according to BT.709. An inner one of two rectangular parallelepipeds in FIG. 8 represents a range covered by luminance and color difference signals according to BT.709, and an outer rectangular parallelepipeds represents a range covered by luminance and color difference signals according to the present invention.

Figure 9:
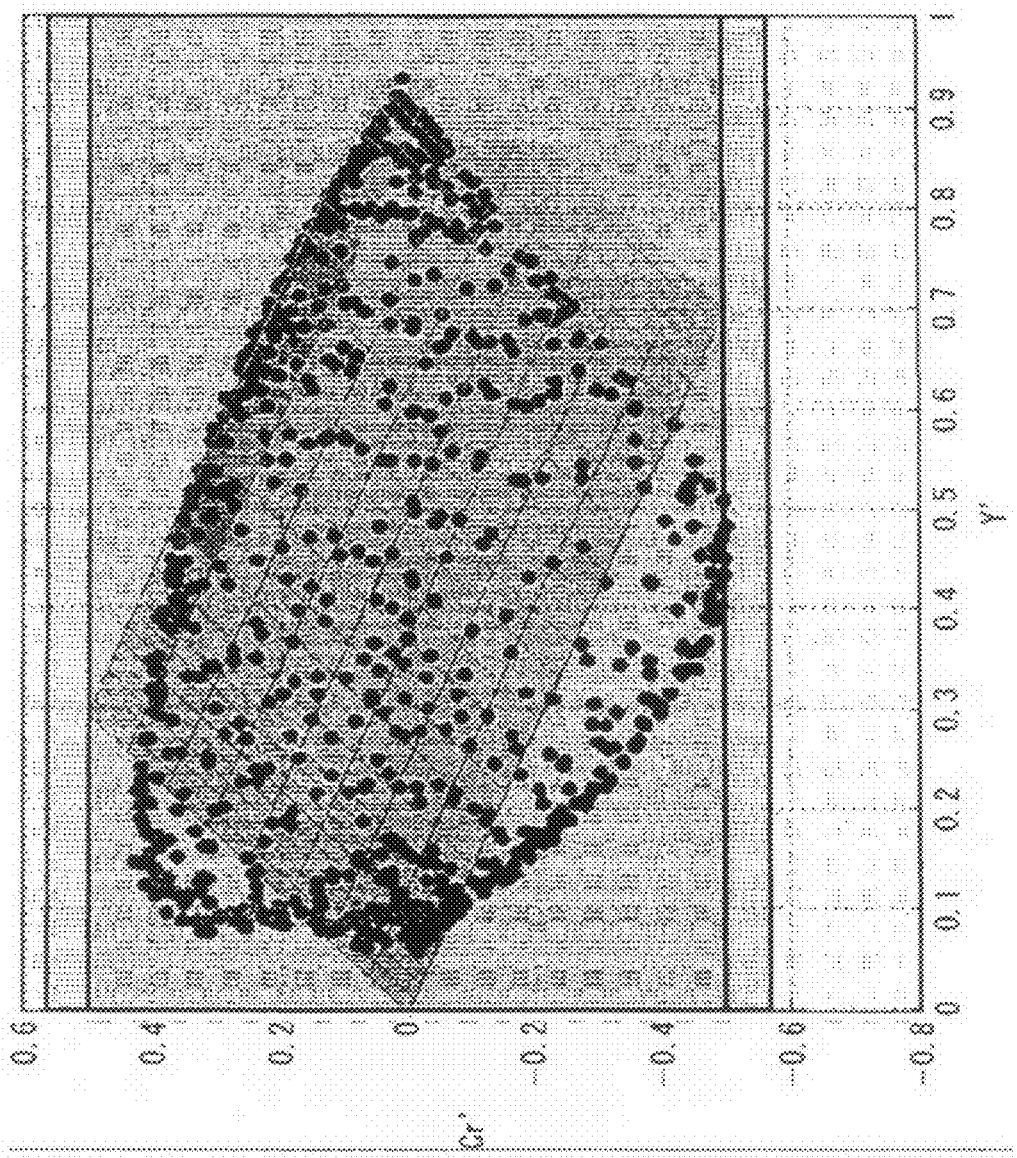
FIG. 9 is a diagram showing the relationship of FIG. 8 as projected in the direction of Cb'.

FIG. 9 shows the relationship of FIG. 8 as projected in the direction of Cb'.

In FIG. 9, the marks • represent the 768 colors of the Munsell color cascade, and the range of a parallelepiped in a grid pattern represents colors expressed by color signals according to BT.709. An inner one of two rectangles in FIG. 9 represents a range covered by luminance and color difference signals according to BT.709, and an outer rectangle represents a range covered by luminance and color difference signals according to the present invention.

As shown in FIGS. 8 and 9, the present invention fully covers the color space of 768 colors of the Munsell color cascade and color signals under BT.709.

Figure 10:
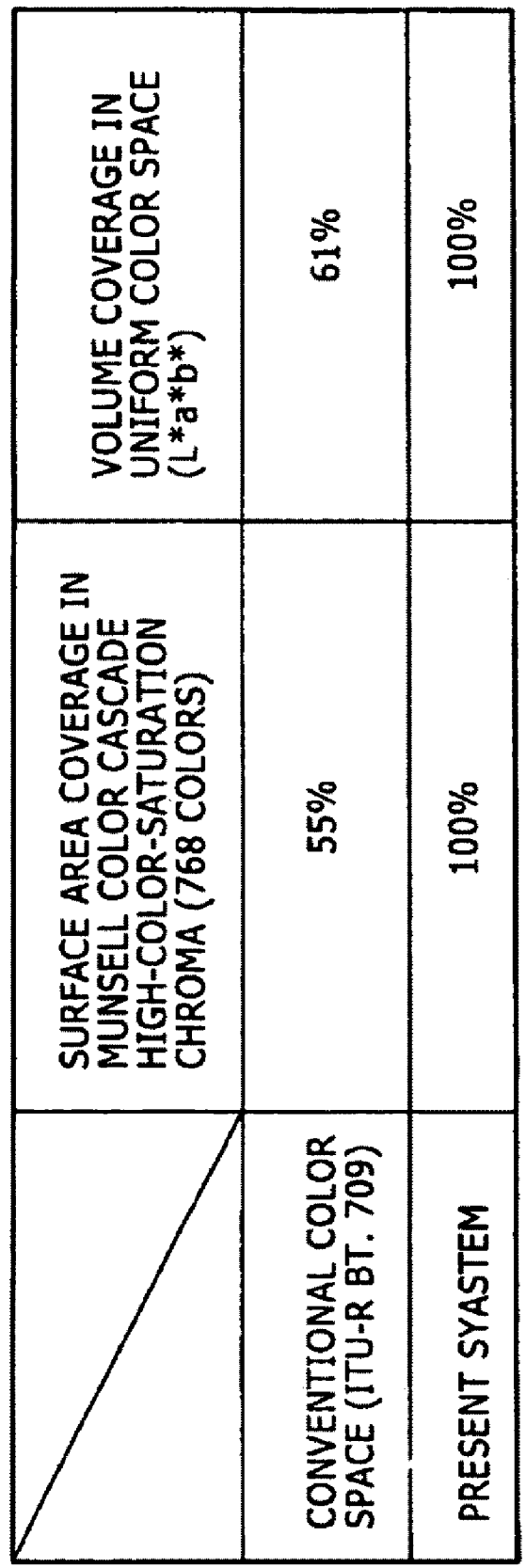
FIG. 10 is a diagram showing coverages in the color spaces covered by BT.709 and the present invention.

FIG. 10 shows coverages in the color spaces covered by BT.709 and the present invention.

The coverage of the surface area of the 768 colors of the Munsell color cascade is 55% in the color space of color signals under BT.709, and 100% in the color space of luminance and color difference signals according to the present invention.

The coverage of the volume of a uniform color space (L*a*b*) is 61% in the color space of color signals under BT.709, and 100% in the color space of luminance and color difference signals according to the present invention.

According to the present invention, therefore, a wider color space can be covered and colors in a wider color range can be expressed.

Figure 11:
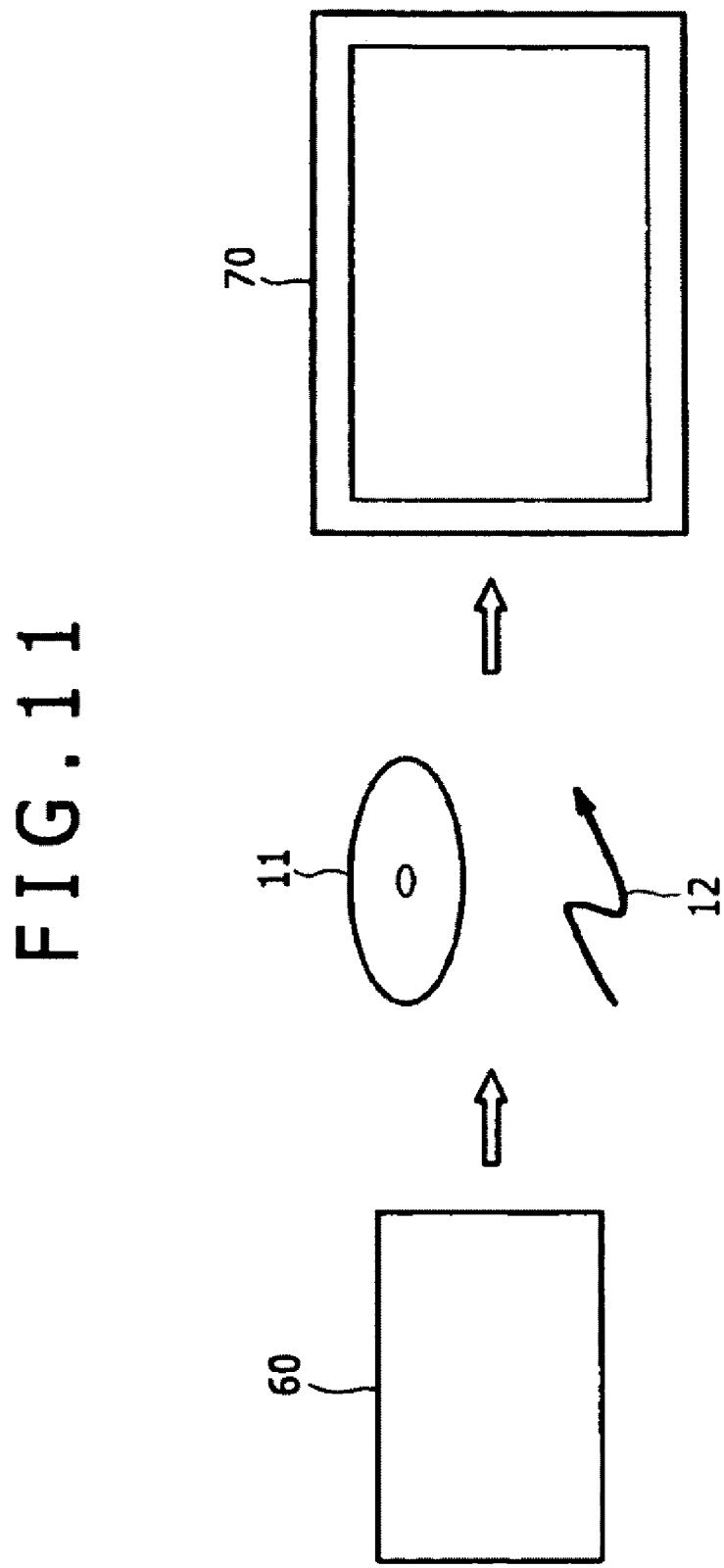
FIG. 11 is a block diagram of an AV system according to the present invention.

FIG. 11 shows in block form an AV system according to the present invention.

As shown in FIG. 11, the AV system includes a video camera 60 and a television receiver 70. In FIG. 11, a signal of an image captured by a video camera 60 is supplied through a recording medium 11 or a network 12 to the television receiver 70, which displays the image captured by the video camera 60.

Figure 12:
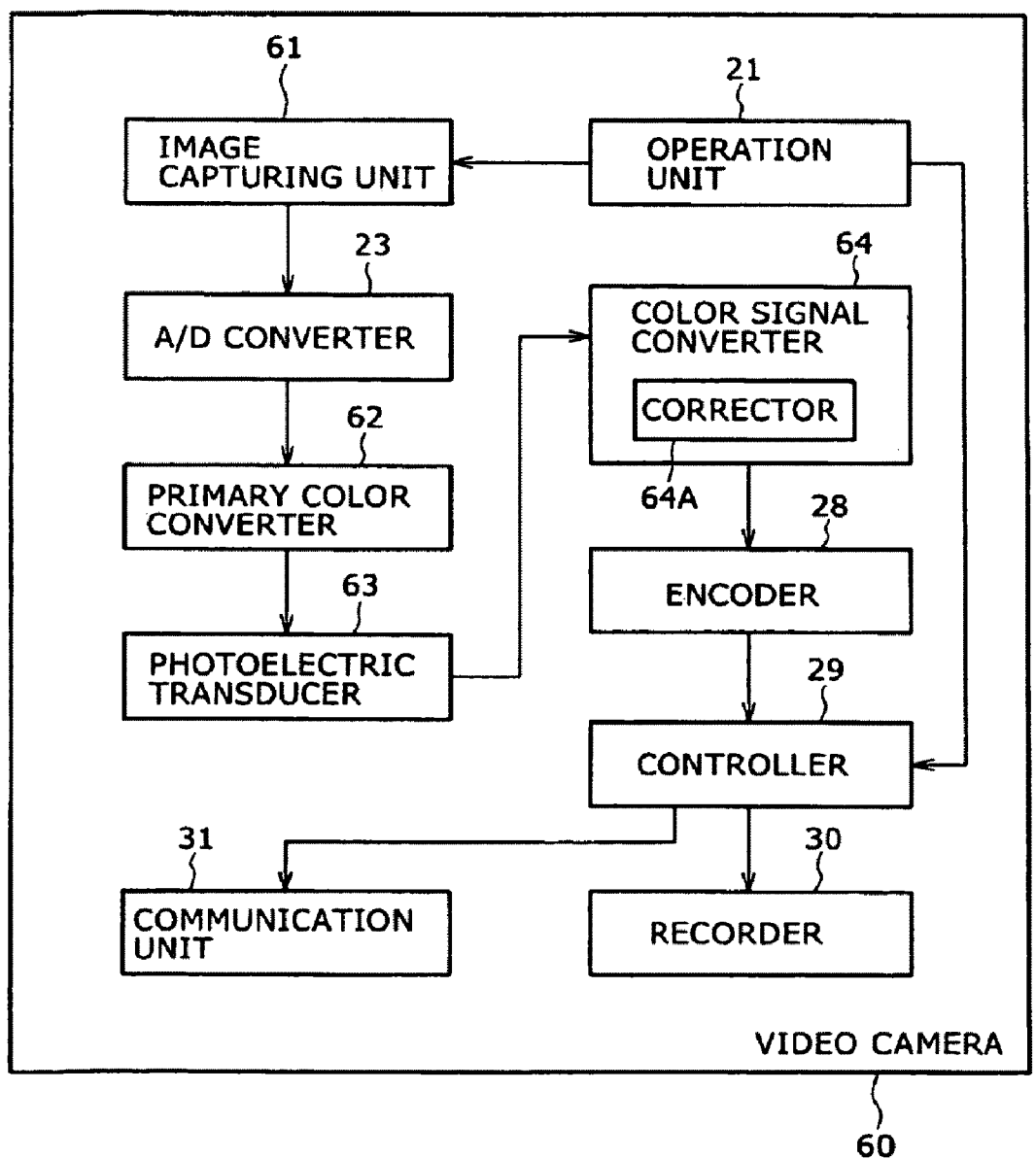
FIG. 12 is a block diagram of a video camera of the AV system shown in FIG. 11.

FIG. 12 shows in block form details of the video camera 60 illustrated in FIG. 11. Those parts of the video camera 60 shown in FIG. 12 which are identical to those of the video camera 1 shown in FIG. 1 are denoted by identical reference numerals, and will not be described in detail below.

In FIG. 12, the video camera 60 includes a operation unit 21, an image capturing unit 61, an A/D converter 23, a primary color converter 62, a photoelectric transducer 63, a color signal converter 64, a corrector 64A, an encoder 28, a controller 29, a recorder 30, and a communication unit 31.

The image capturing unit 61 starts or stops an image capturing process according to an instruction from the operation unit 21. The image capturing unit 61 supplies an image signal indicative of a captured image to the A/D converter 23. The image capturing unit 61 includes a CMOS (Complementary Metal Oxide Semiconductor) imager, a CCD (Charge Coupled Device), or the like, and outputs color signals R, G, B (Red, Green, Blue) as an image signal.

The primary color points of the CMOS imager or the CCD as the image capturing unit 61 should be positioned in a wider color range than the primary color points according to BT.709 in order to transmit information of colors in a wider color range.

The A/D converter 23 converts analog color signals R, G, B supplied from the image capturing unit 61 into digital color signals R, G, b, and supplies the digital color signals R, G, B to the primary color converter 62. The color signals R, G, B that are supplied from the A/D converter 23 to the primary color converter 62 are referred to as color signals $R_{ex}$, $G_{ex}$, $B_{ex}$.

Figures 3, 4:
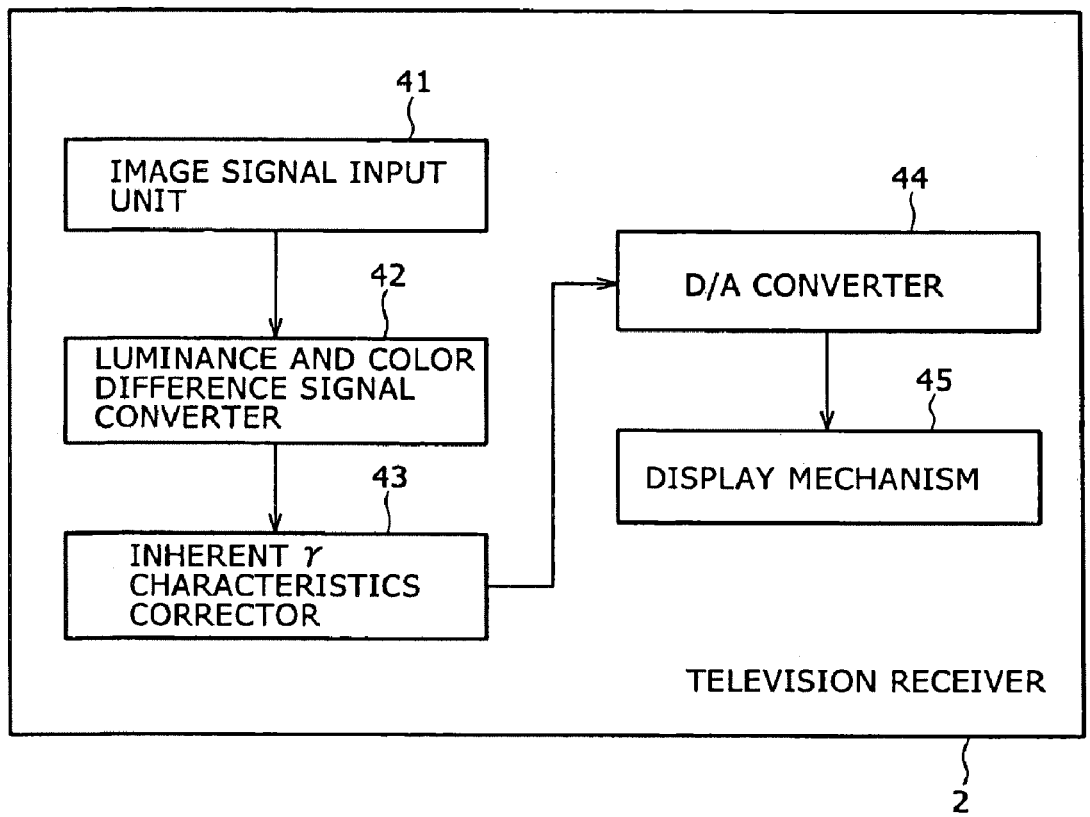
FIG. 3 is a block diagram of a television receiver of the conventional AV system shown in FIG. 1.
FIG. 4 is a diagram showing primary colors and reference white according to ITU-R B.709.

The primary color converter 62 converts the color signals $R_{ex}$, $G_{ex}$, $B_{ex}$ supplied from the A/D converter 23 into color signals $R_{ex709}$, $G_{ex709}$, $B_{ex709}$ based on primary colors under BT.709, and supplies the color signals $R_{ex709}$, $G_{ex709}$, $B_{ex709}$ to the photoelectric transducer 63. Specifically, the primary color converter 62 converts the color signals $R_{ex}$, $G_{ex}$, $B_{ex}$ supplied from the A/D converter 23 into color signals $R_{ex709}$, $G_{ex709}$, $B_{ex709}$ based on primary colors under BT.709 according to the equation (6) shown below. The primary colors under BT.709 are shown in FIG. 4.

$$\begin{pmatrix} R_{ex709} \\ G_{ex709} \\ B_{ex709} \end{pmatrix} = \begin{pmatrix} 1.5968 & -0.6351 & 0.0383 \\ -0.1464 & 1.2259 & -0.0795 \\ -0.0141 & -0.1086 & 1.1227 \end{pmatrix} \begin{pmatrix} R_{ex} \\ G_{ex} \\ B_{ex} \end{pmatrix} \quad (6)$$

The color signals $R_{ex709}$, $G_{ex709}$, $B_{ex709}$ obtained by the primary color conversion performed by the primary color converter 62 can be of negative values or values in excess of 1 if the primary color points of the image capturing unit 61 are different from the primary color points of BT.709.

The photoelectric transducer 63 converts the color signals $R_{ex709}$, $G_{ex709}$, $B_{ex709}$ supplied from the primary color converter 62 into color signals $R'_{ex709}$, $G'_{ex709}$, $B'_{ex709}$ according to the photoelectric transducer characteristics of present invention, and supplies the converted color signals $R'_{ex709}$, $G'_{ex709}$, $B'_{ex709}$ to the color signal converter 64.

That is, the photoelectric transducer 63 converts the color signals $R_{ex709}$, $G_{ex709}$, $B_{ex709}$ supplied from the primary color converter 62 into color signals $R'_{ex709}$, $G'_{ex709}$, $B_{ex709}$ according to the equation (5), and supplies the converted color signals $R'_{ex709}$, $G'_{ex709}$, $B'_{ex709}$ to the color signal converter 64.

The equation (5) is an equation for converting the color signal $R_{ex709}$ into the color signal $R'_{ex709}$. The color signals $G_{ex709}$, $B_{ex709}$ are also converted respectively into the color signals $G'_{ex709}$, $B'_{ex709}$ according to the equation (5) as with the color signal $R_{ex709}$.

The range from 0 to 1.0 of the color signals $R'_{ex709}$, $G'_{ex709}$, $B'_{ex709}$ which are converted from the color signals $R_{ex709}$, $G_{ex709}$, $B_{ex709}$ by the photoelectric transducer 63 based on the photoelectric transducer characteristics according to the present invention is the same as with BT.709.

The color signal converter 64 converts the color signals $R'_{ex709}$, $G'_{ex709}$, $B'_{ex709}$ supplied from the photoelectric transducer 63 into a luminance signal $Y'_{ex709}$ and color difference signals $Cb'_{ex709}$, $Cr'_{ex709}$ according to the equation (7) shown below. The color signal converter 64 has the corrector 64A incorporated therein. The corrector 64A corrects the luminance signal $Y'_{ex709}$ into a luminance signal in a numerical range from 0 to 1.0 defined according to the present invention, and corrects the color difference signals $Cb'_{ex709}$, $Cr'_{ex709}$ into color difference signals in a numerical range from −0.57 to 0.56 defined according to the present invention, and supplies the corrected luminance signal and the corrected color difference signals to the encoder 28.

$$\begin{pmatrix} Y'_{ex709} \\ Cb'_{ex709} \\ Cr'_{ex709} \end{pmatrix} = \begin{pmatrix} 0.2126 & 0.7152 & 0.0722 \\ -0.1146 & -0.3854 & 0.5000 \\ 0.5000 & -0.4542 & -0.0458 \end{pmatrix} \begin{pmatrix} R'_{ex709} \\ G'_{ex709} \\ B'_{ex709} \end{pmatrix} \quad (7)$$

Specifically, the corrector 64A of the color signal converter 64 corrects the luminance signal $Y'_{ex709}$ which is smaller than 0 into 0 and corrects the luminance signal $Y'_{ex709}$ which is greater than 1.0 into 1.0, for example. The corrector 64A also corrects the color difference signals $Cb'_{ex709}$, $Cr'_{ex709}$ which are smaller than −0.57 into −0.57, and corrects the color difference signals $Cb'_{ex709}$, $Cr'_{ex709}$ which are greater than 0.56 into 0.56. The corrector 64A assigns the corrected luminance signal $Y'_{ex709}$ to an integral value in an integral range from 16 to 235 which is smaller than the integral range from 0 to 255 that can be expressed in 8 bits, and supplies the luminance signal $Y'_{ex709}$ that is assigned to the integral value as a luminance signal according to the present invention to the encoder 28. The corrector 64A assigns the corrected color difference signals $Cb'_{ex709}$, $Cr'_{ex709}$ to an integral value in an integral range from 1 to 254 which is smaller than the integral range from 0 to 255 that can be expressed in 8 bits, and supplies the color difference signals $Cb'_{ex709}$, $Cr'_{ex709}$ that is assigned to the integral value as color difference signals according to the present invention to the encoder 28.

An image capturing and recording process performed by the video camera 60 shown in FIG. 12 will be described below with reference to FIG. 13.

The operation unit 21 instructs the image capturing unit 61 to start capturing an image and at the same time instructs the controller 29 to start recording a captured image, i.e., to control the recorder 30 to record a captured image. In this manner, the image capturing and recording process is started.

Figure 13:
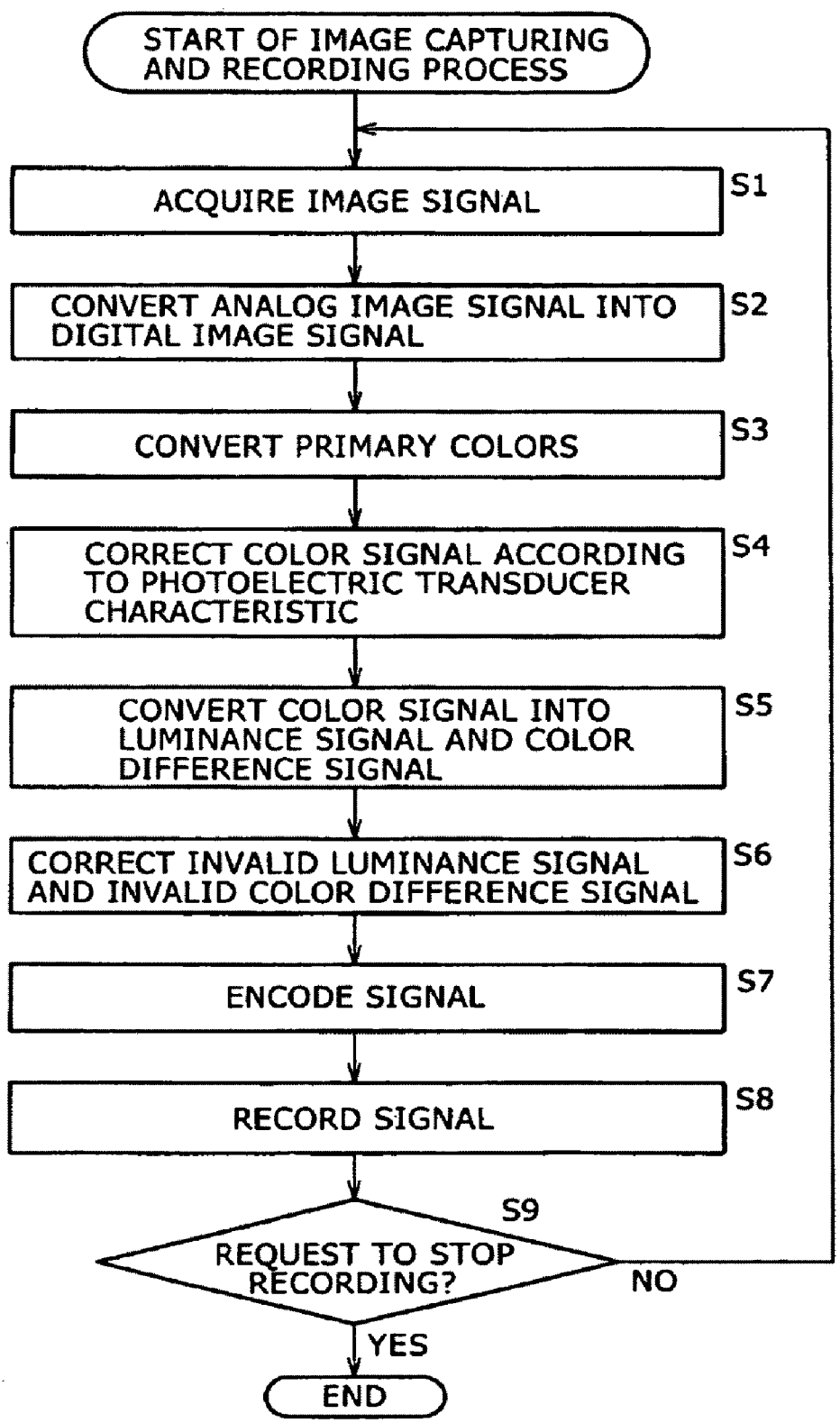
FIG. 13 is a flowchart of an image capturing and recording process performed by the video camera shown in FIG. 12.

In step S1 shown in FIG. 13, the image capturing unit 61 captures an image of a subject to acquire an image signal, and supplies color signals R, G, B as the image signal to the A/D converter 23. Then, control goes to step S2.

In step S2, the A/D converter 23 converts the analog color signals R, G, B supplied from the image capturing unit 61 into digital color signals R, G, B, and supplies the digital color signals $R_{ex}$, $G_{ex}$, $B_{ex}$ to the primary color converter 62. Then, control goes to step S3.

In step S3, the primary color converter 62 converts the color signals $R_{ex}$, $G_{ex}$, $B_{ex}$ supplied from the A/D converter 23 into color signals $R_{ex709}$, $G_{ex709}$, $B_{ex709}$ based on primary colors under BT.709, and supplies the color signals $R_{ex709}$, $G_{ex709}$, $B_{ex709}$ to the photoelectric transducer 63. Then, control goes to step S4.

In step S4, the photoelectric transducer 63 converts the color signals $R_{ex709}$, $G_{ex709}$, $B_{ex709}$ supplied from the primary color converter 62 into color signals $R'_{ex709}$, $G'_{ex709}$, $B'_{ex709}$ based on the photoelectric transducer characteristics according to the present invention, and supplies the converted color signals $R'_{ex709}$, $G'_{ex709}$, $B'_{ex709}$ to the color signal converter 64. Then, control goes to step S5.

In step S5, the color signal converter 64 converts the color signals $R'_{ex709}$, $G'_{ex709}$, $B'_{ex709}$ supplied from the photoelectric transducer 63 into a luminance signal $Y'_{ex709}$ and color difference signals $Cb'_{ex709}$, $Cr'_{ex709}$ according to the present invention. Then, control goes to step S6.

In step S6, the corrector 64A of the color signal converter 64 corrects invalid values of the luminance signal $Y'_{ex709}$ and the color difference signals $Cb'_{ex709}$, $Cr'_{ex709}$ which are produced in step S5.

Specifically, the corrector 64A corrects the luminance signal $Y'_{ex709}$ into a luminance signal $Y'_{ex709}$ in a numerical range from 0 to 1.0 defined according to the present invention, and corrects the color difference signals $Cb'_{ex709}$, $Cr'_{ex709}$ into color difference signals $Cb'_{ex709}$, $Cr'_{ex709}$ in a numerical range from −0.57 to 0.56 defined according to the present invention. For example, the corrector 64A corrects the luminance signal $Y'_{ex709}$ which is smaller than 0 into 0 and corrects the luminance signal $Y'_{ex709}$ which is greater than 1.0 into 1.0. The corrector 64A also corrects the color difference signals $Cb'_{ex709}$, $Cr'_{ex709}$ which are smaller than −0.57 into −0.57, and corrects the color difference signals $Cb'_{ex709}$, $Cr'_{ex709}$ which are greater than 0.56 into 0.56. The corrector 64A expresses the corrected luminance signal $Y'_{ex709}$ and the corrected color difference signals $Cb'_{ex709}$, $Cr'_{ex709}$ according to the present invention with the 8 bits described with reference to FIG. 5, and supplies the luminance signal $Y'_{ex709}$ and the color difference signals $Cb'_{ex709}$, $Cr'_{ex709}$ to the encoder 28. Then, control goes to step S7.

In step S7, the encoder 28 encodes the luminance signal $Y'_{ex709}$ and the color difference signals $Cb'_{ex709}$, $Cr'_{ex709}$ supplied from the color signal converter 64 according to a predetermined format such as MPEG, for example, and supplies the resultant encoded data to the controller 29. Then, control goes to step S8.

In step S8, the controller 29 supplies the encoded data supplied from the encoder 28 to the recorder 30. The recorder 30 records the encoded data supplied from the controller 29 in the recording medium 11 shown in FIG. 1. Control then goes to step S9.

In step S9, the operation unit 21 determines whether there is a request to stop the image capturing and recording process or not.

If it is judged in step S9 that there is no request to stop the image capturing and recording process, then control goes back to step S1 to repeat the image capturing and recording process. If it is judged in step S9 that there is a request to stop the image capturing and recording process, then the operation unit 21 instructs the image capturing unit 61 to stop capturing an image, and also instructs the controller 29 to stop recording a captured image. In this manner, the image capturing and recording process is stopped.

Figure 14:
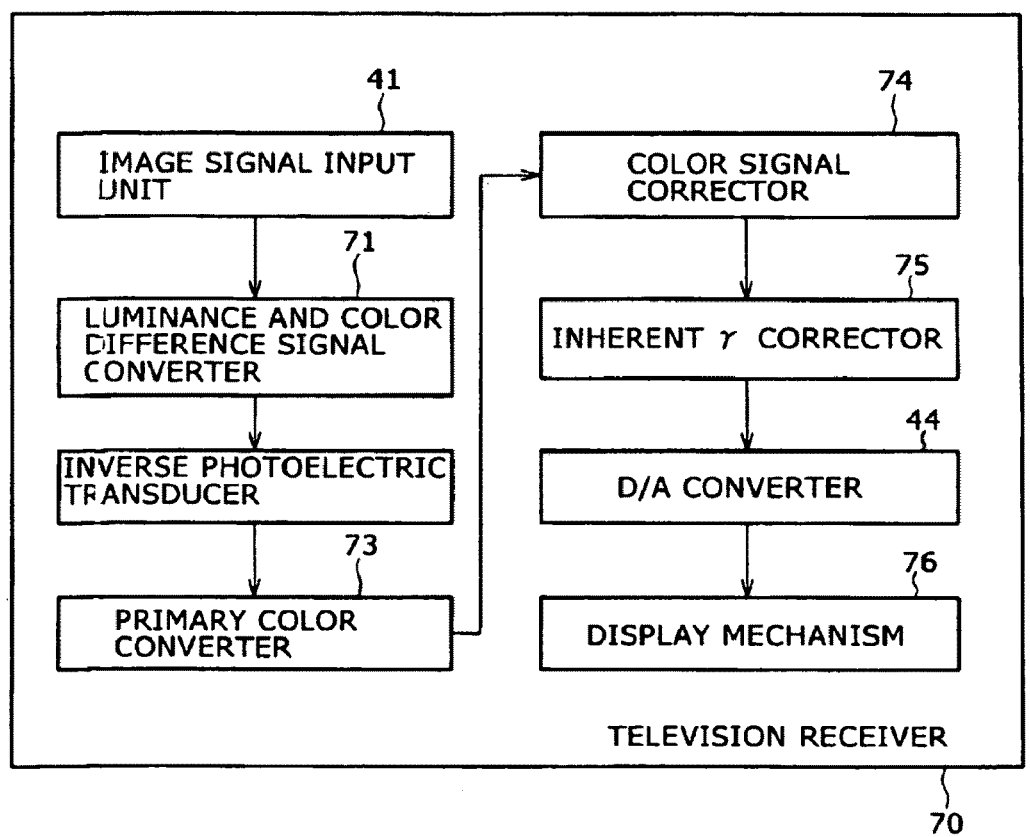
FIG. 14 is a block diagram of a television receiver of the AV system shown in FIG. 11.

FIG. 14 shows in block form the television receiver 70 of the AV system shown in FIG. 11. Those parts of the television receiver 70 shown in FIG. 14 which are identical to those of the television receiver 2 shown in FIG. 3 are denoted by identical reference numerals, and will not be described in detail below.

In FIG. 14, the television receiver 70 includes an image signal input unit 41, a luminance and color difference signal converter 71, an inverse photoelectric transducer 72, a primary color converter 73, a color signal corrector 74, an inherent γ characteristics corrector 75, a D/A converter 44, and a display mechanism 76.

The luminance and color difference signal converter 71 converts the luminance signal $Y'_{ex709}$ and the color difference signals $Cb'_{ex709}$, $Cr'_{ex709}$ supplied from the image signal input unit 41 into color signals $R'_{ex709}$, $G'_{ex709}$, $B'_{ex709}$ based on the photoelectric transducer characteristics according to the following equation (8), and supplies the color signals $R'_{ex709}$, $G'_{ex709}$, $B'_{ex709}$ to the inverse photoelectric transducer 72:

$$\begin{pmatrix} R'_{ex709} \\ G'_{ex709} \\ B'_{ex709} \end{pmatrix} = \begin{pmatrix} 1.0000 & 0.0000 & 1.5747 \\ 1.0000 & -0.1873 & -0.4682 \\ 1.0000 & 1.8556 & 0.0000 \end{pmatrix} \begin{pmatrix} Y'_{ex709} \\ Cb'_{ex709} \\ Cr'_{ex709} \end{pmatrix} \quad (8)$$

Specifically, the luminance and color difference signal converter 71 sets the luminance signal $Y'_{ex709}$ of the integral value in the integral range from 16 to 235 which can be expressed in 8 bits, to a value in a numerical range from 0 to 1.0, and also sets each of the color difference signals $Cb'_{ex709}$, $Cr'_{ex709}$ of the integral value in the integral range from 1 to 254 which can be expressed in 8 bits, to a value in a numerical range from –0.57 to 0.56. The luminance and color difference signal converter 71 also converts the luminance signal $Y'_{ex709}$ expressed in the numerical range from 0 to 1.0 and the color difference signals $Cb'_{ex709}$, $Cr'_{ex709}$ expressed in the numerical range from –0.57 to 0.56 into color signals $R'_{ex709}$, $G'_{ex709}$, $B'_{ex709}$ according to the equation (8).

The inverse photoelectric transducer 72 converts the color signals $R'_{ex709}$, $G'_{ex709}$, $B'_{ex709}$ supplied from the luminance and color difference signal converter 71 according to the photoelectric transducer characteristics of the present invention. Specifically, the inverse photoelectric transducer 72 converts the color signals $R'_{ex709}$, $G'_{ex709}$, $B'_{ex709}$ supplied from the luminance and color difference signal converter 71 into color signals $R_{ex709}$, $G_{ex709}$, $B_{ex709}$ according to the following equation (9), and supplies the color signals $R_{ex709}$, $G_{ex709}$, $B_{ex709}$ to the primary color converter 73.

$R_{ex709} = ((R'_{ex709} + 0.099)^{1/0.45}/1.099) \quad 0.081 \leq R'_{ex709}$ $R_{ex709} = R'_{ex709}/4.5 \quad -0.081 \leq R'_{ex709} < 0.081$ $R_{ex709} = -((-R'_{ex709} + 0.099)^{1/0.45}/1.099) \quad R'_{ex709} < -0.081 \quad (9)$ Specifically, the inverse photoelectric transducer 72 performs a process which is an inversion of the process performed by the photoelectric transducer 63 of the video camera 60 (see FIG. 12) on the color signals $R'_{ex709}$, $G'_{ex709}$, $B'_{ex709}$ supplied from the luminance and color difference signal converter 71, thereby converting the color signals $R'_{ex709}$, $G'_{ex709}$, $B'_{ex709}$ supplied from the luminance and color difference signal converter 71 back into the color signals $R_{ex709}$, $G_{ex709}$, $B_{ex709}$ prior to being converted by the photoelectric transducer 63 of the video camera 60.

The equation (9) is an equation for converting the color signal $R'_{ex709}$ into the color signal $R_{ex709}$. The color signals $G'_{ex709}$, $B'_{ex709}$ are also converted respectively into the color signals $G_{ex709}$, $B_{ex709}$ according to the equation (9) as with the color signal $R'_{ex709}$.

The color converter 73 converts the color signals $R_{ex709}$, $G_{ex709}$, $B_{ex709}$ supplied from the inverse photoelectric transducer 72 into color signals $R_{tv}$, $B_{tv}$, $G_{tv}$ based on the primary colors of the display mechanism 76, and supplies the color signals $R_{tv}$, $B_{tv}$, $G_{tv}$ to the color signal corrector 74. Specifically, the primary color converter 73 converts the color signals $R_{ex709}$, $G_{ex709}$, $B_{ex709}$ supplied from the inverse photoelectric transducer 72 into color signals $R_{tv}$, $B_{tv}$, $G_{tv}$ based on the primary colors of the display mechanism 76 according to the following equation (10):

$$\begin{pmatrix} R_{tv} \\ G_{tv} \\ B_{tv} \end{pmatrix} = \begin{pmatrix} 0.6575 & 0.3408 & 0.0017 \\ 0.0795 & 0.8621 & 0.0583 \\ 0.0159 & 0.0877 & 0.8964 \end{pmatrix} \begin{pmatrix} R_{ex709} \\ G_{ex709} \\ B_{ex709} \end{pmatrix} \quad (10)$$

The color signal corrector 74 corrects those of the color signals $R_{tv}$, $B_{tv}$, $G_{tv}$ supplied from the primary color converter 73 which cannot be displayed by the display mechanism 76, and supplies the corrected color signals to the inherent γ characteristics corrector 75. Specifically, if the signal levels of the color signals $R_{tv}$, $B_{tv}$, $G_{tv}$ supplied from the primary color converter 73 are not contained in the range of signals levels of color signals which cannot be displayed by the display mechanism 76, then the color signal corrector 74 corrects the color signals. $R_{tv}$, $B_{tv}$, $G_{tv}$ into color signals having signal levels which can be displayed by the display mechanism 76.

For example, if the color signals $R_{tv}$, $B_{tv}$, $G_{tv}$ supplied to the color signal corrector 74 are of negative values, then the color signal corrector 74 corrects the color signals $R_{tv}$, $B_{tv}$, $G_{tv}$ into a value of 0.

If the signal levels of the color signals $R_{tv}$, $B_{tv}$, $G_{tv}$ supplied from the primary color converter 73 are color signals which cannot be displayed by the display mechanism 76, then the color signal corrector 74 may correct the color signals $R_{tv}$, $B_{tv}$, $G_{tv}$ into color signals, which have minimum color differences with the color signals $R_{tv}$, $B_{tv}$, $G_{tv}$, within a color range which can be displayed by the display mechanism 76. Alternatively, the color signal corrector 74 may correct the color signals $R_{tv}$, $B_{tv}$, $G_{tv}$ into color signals that keeps luminance, but has lower saturation.

The inherent γ characteristics corrector 75 converts the color signals $R_{tv}$, $G_{tv}$, $B_{tv}$ supplied from the color signal corrector 74 into color signals $R'_{tv}$, $G'_{tv}$, $B'_{tv}$ for the display mechanism 76 in order to inherent correct γ characteristics in the display mechanism 76 of the television receiver 70, and supplies the color signals $R'_{tv}$, $G'_{tv}$, $B'_{tv}$ to the D/A converter 44.

The D/A converter 44 converts the digital color signals $R'_{tv}$, $G'_{tv}$, $B'_{tv}$ supplied from the inherent γ characteristics corrector 75 into analog color signals $R'_{tv}$, $G'_{tv}$, $B'_{tv}$, and supplies the analog color signals $R'_{tv}$, $G'_{tv}$, $B'_{tv}$ to the display mechanism 76.

The display mechanism 76 includes a CRT or the like, and displays an image based on the color signals $R'_{tv}$, $G'_{tv}$, $B'_{tv}$ supplied from the D/A converter 44. The display mechanism 76 according to the present invention is arranged to express, i.e., display, colors in a wider color range than the display mechanism 45 shown in FIG. 3.

An image display process performed by the television receiver 70 shown in FIG. 14 will be described below with reference to FIG. 15.

Figure 15:
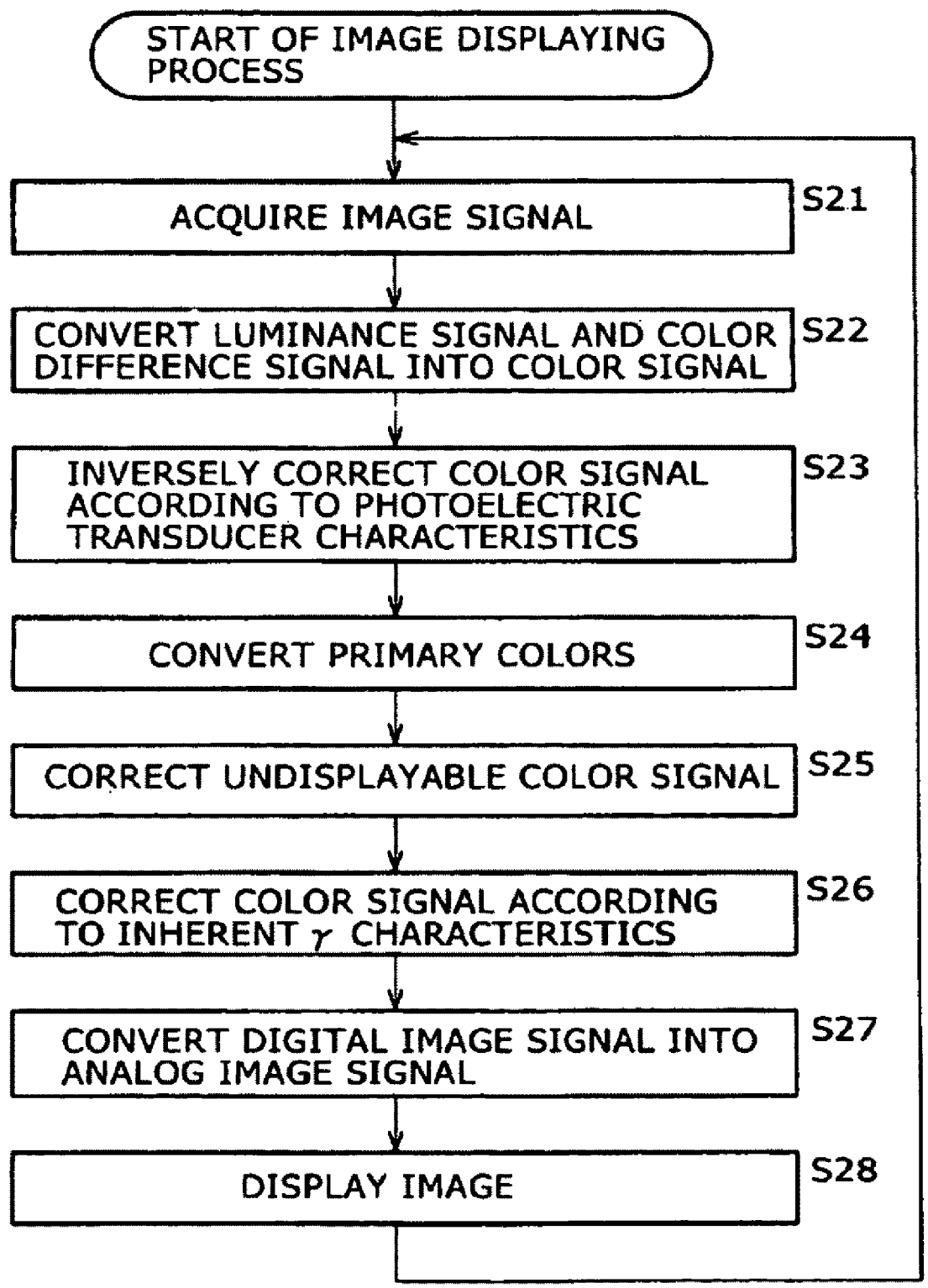
FIG. 15 is a flowchart of an image displaying process performed by the television receiver shown in FIG. 14.

In step S21 shown in FIG. 15, the image signal input unit 41 acquires an image signal. The image signal input unit 41 also decodes the supplied encoded data according to MPEG, for example, and supplies a luminance signal $Y'_{ex709}$ and color difference signals $Cb'_{ex709}$, $Cr'_{ex709}$ which are produced from the decoded data, to the luminance and color difference signal converter 71. Then, control goes to step S22.

In step S22, the luminance and color difference signal converter 71 converts the luminance signal $Y'_{ex709}$ and the color difference signals $Cb'_{ex709}$, $Cr'_{ex709}$ supplied from the image signal input unit 41 into color signals $R'_{ex709}$, $G'_{ex709}$, $B'_{ex709}$ according to the equation (8), and supplies the color signals $R'_{ex709}$, $G'_{ex709}$, $B'_{ex709}$ to the inverse photoelectric transducer 72. Then, control goes to step S23.

In step S23, the inverse photoelectric transducer 72 converts the color signals $R'_{ex709}$, $G'_{ex709}$, $B'_{ex709}$ supplied from the luminance and color difference signal converter 71 into color signals $R_{ex709}$, $G_{ex709}$, $B_{ex709}$ according to the equation (9), and supplies the color signals $R_{ex709}$, $G_{ex709}$, $B_{ex709}$ to the primary color converter 73. Then, control goes to step S24.

In step S24, the primary color converter 73 converts the color signals $R_{ex709}$, $G_{ex709}$, $B_{ex709}$ supplied from the inverse photoelectric transducer 72 into color signals $R_{tv}$, $G_{tv}$, $B_{tv}$, based on the primary colors of the display mechanism 76, and supplies the color signals $R_{tv}$, $G_{tv}$, $B_{tv}$ to the color signal corrector 74. Then, control goes to step S25.

In step S25, the color signal corrector 74 corrects those of the color signals $R_{tv}$, $G_{tv}$, $B_{tv}$, supplied from the primary color converter 73 which cannot be displayed by the display mechanism 76, into displayable color signals, and supplies the displayable color signals to the inherent γ corrector 75. Then, control goes to step S26.

In step S26, the inherent γ corrector 75 converts the color signals $R_{tv}$, $G_{tv}$, $B_{tv}$ supplied from the color signal corrector 74 into color signals $R'_{tv}$, $G'_{tv}$, $B'_{tv}$ according to the γ characteristics inherent in the television receiver 70, and supplies the color signals $R'_{tv}$, $G'_{tv}$, $B'_{tv}$ to the D/A converter 44. Then, control goes to step S27.

In step S27, the D/A converter 44 converts the digital color signals $R'_{tv}$, $G'_{tv}$, $B'_{tv}$ supplied from the inherent γ corrector 75 into analog color signals $R'_{tv}$, $G'_{tv}$, $B'_{tv}$, and supplies the analog color signals $R'_{tv}$, $G'_{tv}$, $B'_{tv}$ to the display mechanism 76. Then, control goes to step S28.

In step S28, the display mechanism 76 displays an image based on the color signals $R'_{tv}$, $G'_{tv}$, $B'_{tv}$ supplied from the D/A converter 44. Thereafter, control goes back to step S21 to repeat the image displaying process.

Figure 16:
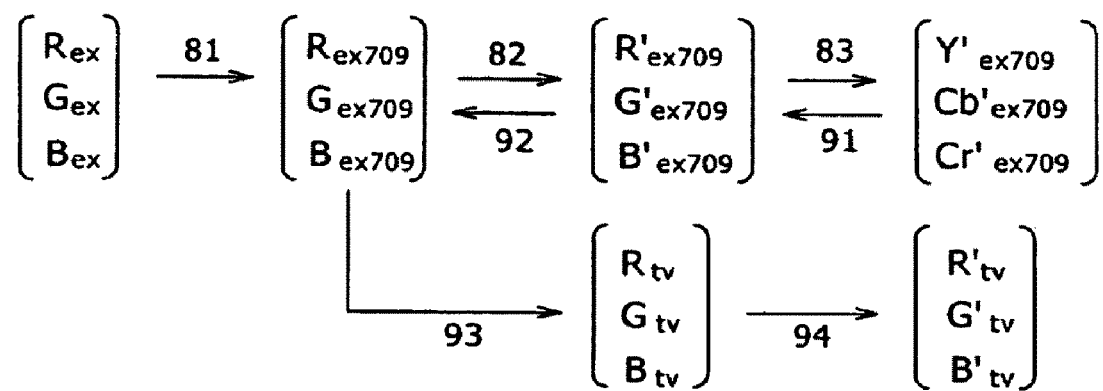
FIG. 16 is a diagram showing flows of signals in the processes performed by the video camera shown in FIG. 12 and the television receiver shown in FIG. 14.

Flows of signals until an image captured by the video camera 1 is displayed by the display mechanism 70 will briefly be described below with reference to FIG. 16. The arrows in FIG. 16 represent processes such as conversion processes on the signals.

Processes 81 through 83 are performed by the video camera 1, and processes 91 through 94 are performed by the television receiver 70.

An image captured by the image capturing unit 61 of the video camera 60 is converted by the A/D converter 23 and supplied as color signals $R_{ex}$, $G_{ex}$, $B_{ex}$ based on the primary colors of the image capturing unit 61 (see FIG. 12) to the primary color converter 62, which converts the color signals $R_{ex}$, $G_{ex}$, $B_{ex}$ into color signals $R_{ex709}$, $G_{ex709}$, $B_{ex709}$ based on the primary colors under BT.709 (the process 81).

Thereafter, the color signals $R_{ex709}$, $G_{ex709}$, $B_{ex709}$ are converted by the photoelectric transducer 63 into color signals $R'_{ex709}$, $G'_{ex709}$, $B'_{ex709}$ according to the photoelectric transducer characteristics of the present invention (the process 82). The color signals $R'_{ex709}$, $G'_{ex709}$ $B'_{ex709}$ are converted by the color signal converter 64 into a luminance signal $Y'_{ex709}$ and color difference signals $Cb'_{ex709}$, $Cr'_{ex709}$ according to the present invention (the process 83). The luminance signal $Y'_{ex709}$ and the color difference signals $Cb'_{ex709}$, $Cr'_{ex709}$ are encoded by the encoder 28 into encoded data, which are recorded by the recorder 30 or transmitted through the network 12.

In the television receiver 70, the encoded data supplied from the video camera 60 are decoded into a luminance signal $Y'_{ex709}$ and color difference signals $Cb'_{ex709}$, $Cr'_{ex709}$ according to the present invention. The luminance signal $Y'_{ex709}$ and the color difference signals $Cb'_{ex709}$, $Cr'_{ex709}$ are converted by the luminance and color difference signal converter 71 into color signals $R'_{ex709}$, $G'_{ex709}$, $B'_{ex709}$ based on the photoelectric transducer characteristics according to the present invention (the process 91). Specifically, the luminance signal $Y'_{ex709}$ and the color difference signals $Cb'_{ex709}$, $Cr'_{ex709}$ are converted back into the color signals $R'_{ex709}$, $G'_{ex709}$, $B'_{ex709}$ generated by the photoelectric transducer 63 of the video camera 63.

Thereafter, the color signals $R'_{ex709}$, $G'_{ex709}$, $B'_{ex709}$ are converted by the inverse photoelectric transducer 72 into color signals $R_{ex709}$, $G_{ex709}$, $B_{ex709}$ based on the primary colors of BT.709, which are generated by the primary color converter 63 of the video camera 60 (the process 92).

The color signals $R_{ex709}$, $G_{ex709}$, $B_{ex709}$ are then converted by the primary color converter 73 into color signals $R_{tv}$, $G_{tv}$, $B_{tv}$ based on the primary colors of the display mechanism 76 (see FIG. 14) (the process 93).

The color signals $R_{tv}$, $G_{tv}$, $B_{tv}$ are converted by the inherent γ corrector 75 into color signals $R'_{tv}$, $G'_{tv}$, $B'_{tv}$ according to the γ characteristics inherent in the television receiver 70 (the process 94). An image is displayed based on the color signals $R'_{tv}$, $G'_{tv}$, $B'_{tv}$ by the display mechanism 76.

As described above, the video camera 60 and the television receiver 70 can reproduce colors in a wide color range that cannot be expressed according to BT.709 based on effective numerical values (signal ranges) of the color difference signals Cb, Cr which are expanded from those values according to BT.709.

The luminance signal Y of the image captured by the video camera 60 is in compliance with BT.709, and the color difference signals Cb, Cr are also in compliance with BT.709 with respect to the range from −0.5 to 0.5. Therefore, when the luminance signal Y and color difference signals Cb, Cr are processed by a television receiver according to BT.709, then an image can be displayed by the television receiver in the color range according to BT.709.

In the video camera 60, each of the primary color converter 62 and the color signal converter 64 can be implemented by a circuit for calculating a 3×3 matrix, and the photoelectric transducer 63 can be implemented by a one-dimensional LUT (Look Up Table). All of the primary color converter 62, the photoelectric transducer 63, and the color signal converter 64 can also be implemented by a three-dimensional LUT.

In the television receiver 70, each of the luminance and color difference signal converter 71 and the primary color converter 73 can be implemented by a circuit for calculating a 3×3 matrix, and each of the inverse photoelectric transducer 72 and the inherent γ corrector 75 can be implemented by a one-dimensional LUT. All of the luminance and color difference signal converter 71, the inverse photoelectric transducer 72, the primary color converter 73, and the inherent γ corrector 75 can also be implemented by a three-dimensional LUT.

In the present embodiment, the range of negative values of the photoelectric transducer characteristics according to the present invention is provided as an expansion of the photoelectric transducer characteristics according to BT.709 in point symmetry with respect to the origin. However, the range of negative values of the photoelectric transducer characteristics according to the present invention may not be provided as an expansion of the photoelectric transducer characteristics according to BT.709 in point symmetry with respect to the origin. Rather, the range of negative values of the photoelectric transducer characteristics according to the present invention may be an expansion in a negative range of the photoelectric transducer characteristics according to ITU-R BT.1361, for example.

In the present embodiment, the present invention is applied to an expansion of BT.709. However, the present invention is also applicable to an expansion of other standards, e.g., BT.601. According to an expansion of BT.601, however, matrixes used in the signal converting processes are different from the matrixes according to the embodiment of the present invention. For example, the signal converting process that is performed by the color signal converter 64 shown in FIG. 12 employs the following equation (11) instead of the equation (7):

$$\begin{pmatrix} Y'_{ex601} \\ Cb'_{601} \\ Cr'_{ex601} \end{pmatrix} = \begin{pmatrix} 0.2990 & 0.5870 & 0.1140 \\ -0.1687 & -0.3313 & 0.5000 \\ 0.5000 & -0.4187 & -0.0813 \end{pmatrix} \begin{pmatrix} R'_{ex601} \\ G'_{ex601} \\ B'_{ex601} \end{pmatrix} \quad (11)$$

Similar expansions may be applicable to other standards wherein a color difference signal in a certain numerical range is assigned to an integral value in an integral range which is smaller than an integral range that can be expressed by a plurality of bits.

The above processing sequence may be performed by either hardware or software.

Figure 17:
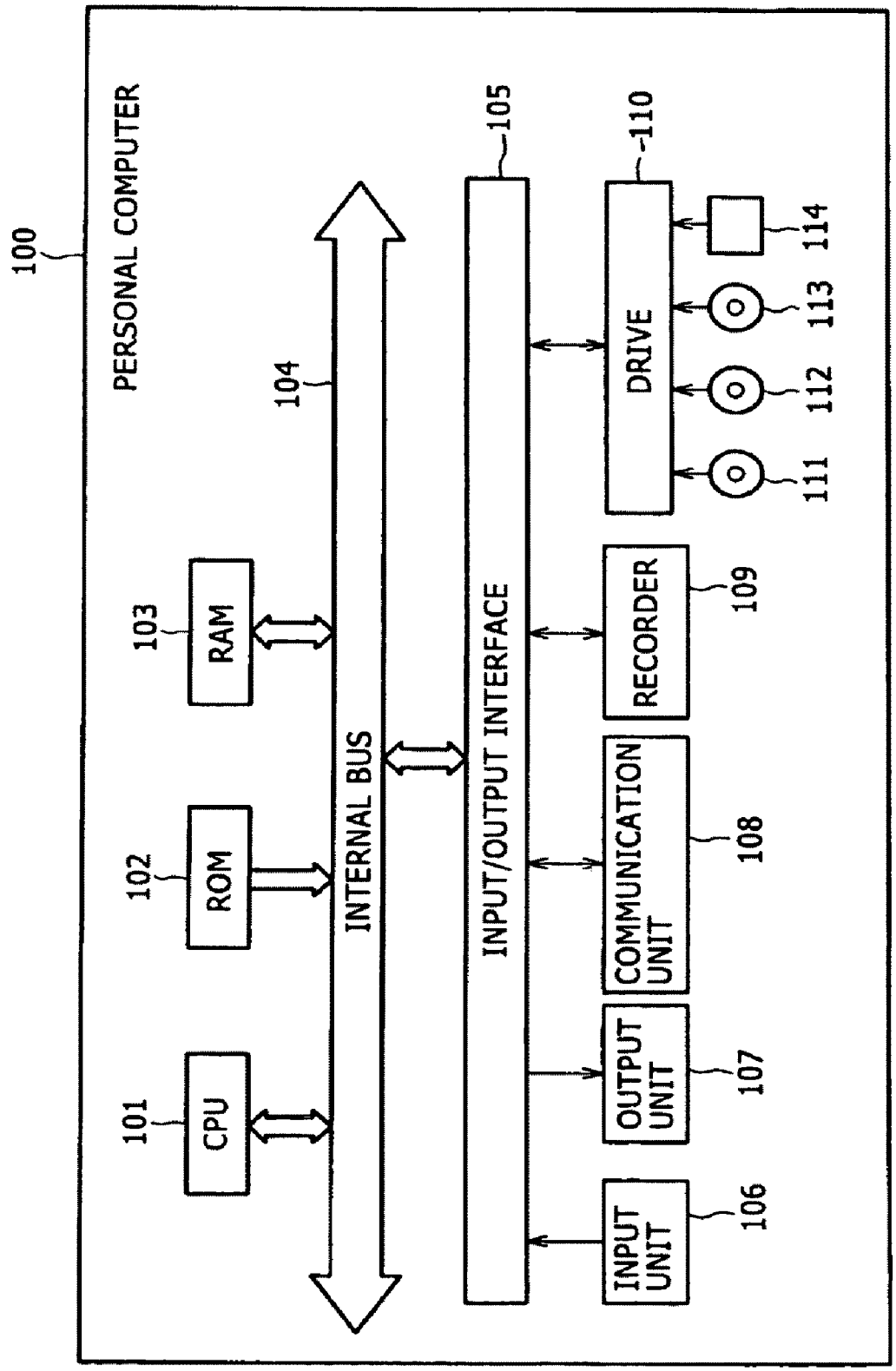
FIG. 17 is a block diagram of a personal computer.

If the processing sequence is performed by software, then a software program is downloaded from a recording medium into a computer of dedicated hardware or a general-purpose personal computer 100 shown in FIG. 17 which is capable of performing various functions based on programs installed therein.

As shown in FIG. 17, the recording medium includes a package medium such as a magnetic disk 111 (including a flexible disk), an optical disk 112 (including a CD-ROM (Compact Disc-Read Only Memory), a DVD (Digital Versatile Disc), a magneto-optical disk 113 (including an MD (Mini-Disc) (trademark)), or a semiconductor memory 114, which is distributed to provide the user with the program separately from the personal computer 100, or a ROM 102 storing the program, or a hard disk incorporated in the recorder 109, which is provided to the user as being incorporated in the personal computer 100.

The personal computer 100 has a CPU 101 for controlling overall operation of the personal computer 100. When the CPU 101 is supplied with an instruction from the user through an input unit 106 having a keyboard and a mouse via a bus 104 and input/output interface 105, the CPU 101 executes a program stored in a ROM (Read Only Memory) 102. Alternatively, the CPU 101 loads a program which is read from the magnetic disk 111, the optical disk 112, the magneto-optical disk 113 or the semiconductor memory 114 which is connected to a drive 110 and installed in the recorder 109, into a RAM (Random Access Memory) 103, and executes the loaded program. The CPU 101 outputs data obtained by the execution of the program to an output unit 107 having a display and a speaker. The CPU 101 acquires data form the input unit 106 which also has a tuner, a camera, or a microphone. The CPU 101 also controls a communication unit 108 to communicate with an external circuit and exchanges data with the external circuit.

The communication unit 108 may perform wireless or wired communications or both wireless and wired communications. The communication unit 108 is not limited any communication processes. For example, the communication unit 108 may operate based on a wireless LAN (Local Area Network) according to any of various processes such as the IEEE (The Institute of Electrical and Electronic Engineers, Inc.) 802.11a or 802.11b or Bluetooth for wireless communications. The communication unit 108 may also operate according to any of various processes such as Ethernet (registered trademark), USB, or IEEE1394 for wired communications.

The program for performing the above processing sequence may be installed into the computer through a wired or wireless communication medium such as a local area network, the Internet, a digital satellite broadcasting medium via an interface such as a router, a modem, or the like, if necessary.

In the present specification, the steps that are descriptive of the program stored in the recording medium include not only processing details that are carried out chronologically in the order of the steps, but also processing details that are carried out parallel or individually, rather than chronologically.

The invention claimed is:

1. A signal processing apparatus for processing a luminance signal and color difference signals and outputting color signals, wherein said luminance signal and said color difference signals comprise a luminance signal and color difference signals which have been obtained by:
converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to said predetermined standard;
converting said second color signals into third color signals according to photoelectric transducer characteristics defined in a numerical range which is greater than a numerical range of color signals corresponding to a luminance signal and color difference signals according to said predetermined standard; and
converting said third color signals into a luminance signal and color difference signals;
wherein said luminance signal comprises a luminance signal according to said predetermined standard and said color difference signals comprise color difference signals in a second numerical range containing said first numerical range, said color difference signals being assigned to an integral value in the second numerical range which can be expressed by said plurality of bits;
wherein said signal processing apparatus comprises:
a luminance and color difference signal converting unit for converting said luminance signal according to said predetermined standard and said color difference signals in said second numerical range into said third color signals;

a characteristic converting unit for converting said third color signals into said second color signals according to said photoelectric transducer characteristics;

a primary color converting unit for converting said second color signals into said first color signals;

a first correcting unit for correcting said first color signals into first corrected signals in a numerical range which can be displayed by a display mechanism for displaying an image; and a second correcting unit for correcting said first corrected signals into second corrected signals according to predetermined characteristics of a display mechanism of the signal processing apparatus.

2. The signal processing apparatus according to claim 1, wherein said photoelectric transducer characteristics are in point symmetry with respect to an origin.

3. The signal processing apparatus according to claim 1, wherein all of said luminance and color difference signal converting unit, said characteristics converting unit, and said primary color converting unit comprise a single look up table.

4. A signal processing method performed by a signal processing apparatus for processing a luminance signal and color difference signals and outputting color signals, wherein the signal processing apparatus includes a processor, wherein said luminance signal and said color difference signals comprise a luminance signal and color difference signals obtained by:

converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to said predetermined standard;

converting said second color signals into third color signals according to photoelectric transducer characteristics defined in a numerical range which is greater than a numerical range of color signals corresponding to a luminance signal and color difference signals according to said predetermined standard; and converting said third color signals into a luminance signal and color difference signals;

wherein said luminance signal comprises a luminance signal according to said predetermined standard and said color difference signals comprise color difference signals in a second numerical range containing said first numerical range, said color difference signals being assigned to an integral value in the second numerical range which can be expressed by said plurality of bits;

wherein said signal processing method comprises the steps of:

converting, by the processor, said luminance signal according to said predetermined standard and said color difference signals in said second numerical range into said third color signals;

converting, by the processor, said third color signals into said second color signals according to said photoelectric transducer characteristics;

converting, by the processor, said second color signals into said first color signals;

correcting, by the processor, said first color signals into first corrected signals in a numerical range which can be displayed by a display mechanism for displaying an image; and correcting, by the processor, said first corrected signals into second corrected signals according to predetermined characteristics of a display mechanism of the signal processing apparatus.

5. A program on a computer-readable medium and executable by a computer for enabling the computer to perform a signal processing process for processing a luminance signal and color difference signals and outputting color signals, wherein said luminance signal and said color difference signals comprise a luminance signal and color difference signals obtained by:

converting first color signals having primary color points in a wider color range than primary color points according to a predetermined standard by which color difference signals having a first numerical range are assigned to an integral value in a first integral range which is smaller than an integral range which can be expressed by a plurality of bits, into second color signals based on primary colors according to said predetermined standard;

converting said second color signals into third color signals according to photoelectric transducer characteristics defined in a numerical range which is greater than a numerical range of color signals corresponding to a luminance signal and color difference signals according to said predetermined standard; and converting said third color signals into a luminance signal and color difference signals;

wherein said luminance signal comprises a luminance signal according to said predetermined standard and said color difference signals comprise color difference signals in a second numerical range containing said first numerical range, said color difference signals being assigned to an integral value in the second numerical range which can be expressed by said plurality of bits;

wherein said signal processing process comprises the steps of:

converting said luminance signal according to said predetermined standard and said color difference signals in said second numerical range into said third color signals;

converting said third color signals into said second color signals according to said photoelectric transducer characteristics;

converting said second color signals into said first color signals;

correcting said first color signals into first corrected signals in a numerical range which can be displayed by a display mechanism for displaying an image; and correcting said first corrected signals into second corrected signals according to predetermined characteristics of a display mechanism of a signal processing apparatus.

* * * * *